US010397958B2

(12) United States Patent
Tsai

(10) Patent No.: US 10,397,958 B2
(45) Date of Patent: Aug. 27, 2019

(54) METHOD AND APPARATUS FOR BACKOFF MECHANISM APPLIED FOR RANDOM ACCESS PROCEDURE IN A WIRELESS COMMUNICATION SYSTEM

(71) Applicant: ASUSTeK COMPUTER INC., Taipei (TW)

(72) Inventor: Hsin-Hsi Tsai, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 15/923,214

(22) Filed: Mar. 16, 2018

(65) Prior Publication Data

US 2018/0270869 A1    Sep. 20, 2018

Related U.S. Application Data

(60) Provisional application No. 62/472,736, filed on Mar. 17, 2017.

(51) Int. Cl.
| | |
|---|---|
| *H04W 72/00* | (2009.01) |
| *H04W 74/08* | (2009.01) |
| *H04W 76/27* | (2018.01) |
| *H04W 74/00* | (2009.01) |
| H04W 84/04 | (2009.01) |
| H04W 88/02 | (2009.01) |

(52) U.S. Cl.
CPC ..... *H04W 74/0833* (2013.01); *H04W 74/006* (2013.01); *H04W 76/27* (2018.02); *H04W 84/042* (2013.01); *H04W 88/02* (2013.01)

(58) Field of Classification Search
CPC ............ H04W 74/0833; H04W 76/27; H04W 84/042; H04W 88/02
USPC ........................................................ 455/450
See application file for complete search history.

(56) References Cited

U.S. PATENT DOCUMENTS

| | | | |
|---|---|---|---|
| 7,095,754 B2 * | 8/2006 | Benveniste | ............ H04L 47/10 370/465 |
| 7,586,932 B2 | 9/2009 | Chou | |
| 2008/0205370 A1 | 8/2008 | Bae | |
| 2011/0299492 A1 | 12/2011 | Lee | |
| 2014/0079013 A1 | 3/2014 | Kim | |

OTHER PUBLICATIONS

US 10,075,900 B2, 09/2018, Jang (withdrawn)*

* cited by examiner

*Primary Examiner* — Amancio Gonzalez
(74) *Attorney, Agent, or Firm* — Amin, Turocy & Watson, LLP

(57) ABSTRACT

Method and apparatus for a backoff mechanism applied for a random access procedure for a user equipment (UE) (e.g. mobile phone) in a wireless communication system are disclosed herein. The UE applies different backoff times for random access procedures based on different factors applicable to the UE. The UE may adjust the backoff time by an offset or a weighted value, and may derive an adjusted backoff time based on different backoff parameter values.

20 Claims, 18 Drawing Sheets

US 10,397,958 B2

METHOD AND APPARATUS FOR BACKOFF MECHANISM APPLIED FOR RANDOM ACCESS PROCEDURE IN A WIRELESS COMMUNICATION SYSTEM

CROSS-REFERENCE TO RELATED APPLICATIONS

This application claims the benefit of U.S. Provisional Application Ser. No. 62/472,736, filed Mar. 17, 2017, and entitled "Method and Apparatus for Backoff Mechanism Applied for Random Access Procedure in a Wireless Communication System," the entirety of which is expressly incorporated herein by reference.

TECHNICAL FIELD

The subject disclosure relates generally to communication systems, and specifically to backoff parameters for random access procedure in a 5G wireless communications system.

BACKGROUND

The 3rd Generation Partnership Project (3GPP), which provides reference designs and identifies issues that require consideration and solutions for 5G, has identified many unresolved issues related to random access procedure, backoff intervals, and user plane latency for 5G systems. Inventions presented in the subject disclosure provide numerous solutions to those issues, including, for example, multiple backoff parameters based on difference services.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details, and without limiting them to particular network environment(s) or standard(s).

Figure 1:
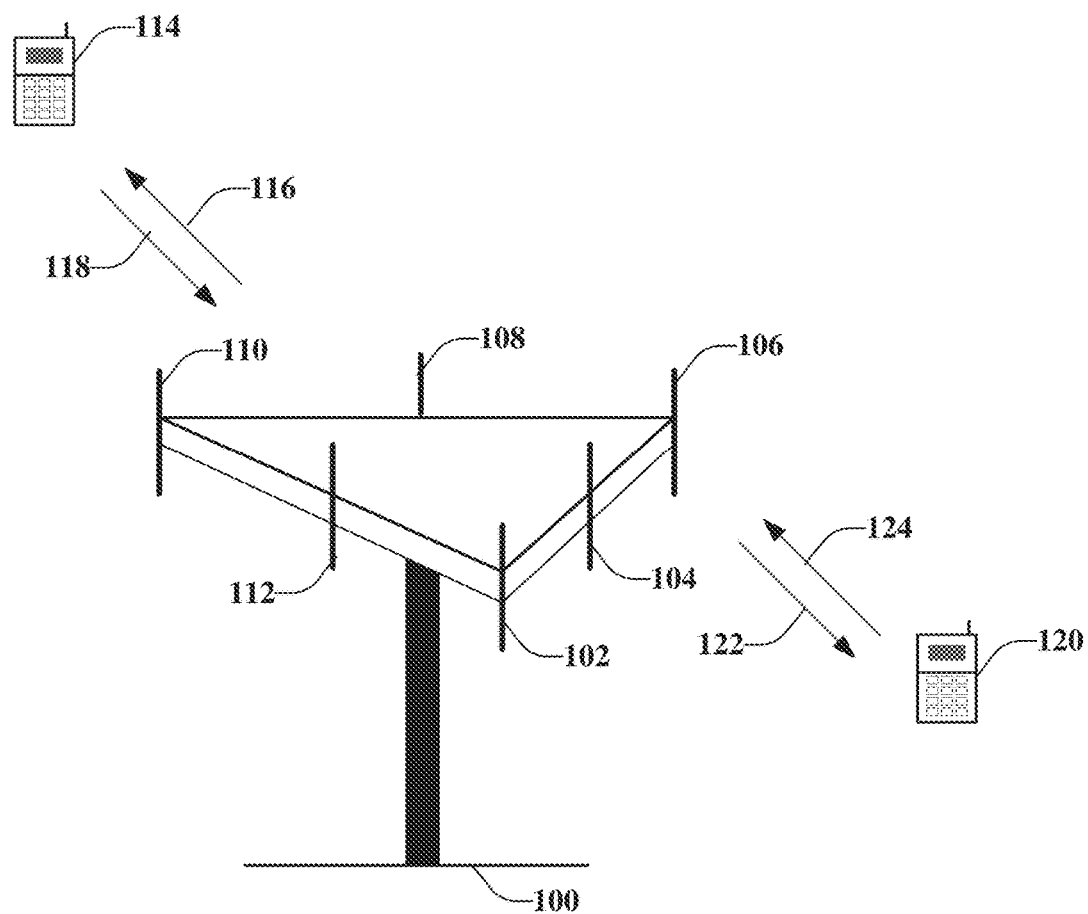
FIG. 1 illustrates an example, non-limiting wireless communications system, in accordance with one or more embodiments described herein.

Referring initially to FIG. 1, illustrated is an example, non-limiting wireless communications system, including mobile devices (or UEs) 114 and 120, and a network node 100. User equipment or mobile device UE1 114 and UE2 120 can be in communication with a network node 100 (e.g., an eNodeB, eNB, network, cell, or other terminology). Antennas 102, 104, 106, 108, 110, and 112 transmit and receive communications between network node 100 and mobile devices, including UE1 114 and UE2 120. As illustrated, UE1 114 and UE2 120 communicate with network node 100 pursuant to the Long-Term Evolution (LTE, also referred to as 4G) standard, as specified in Third Generation Partnership Project (3GPP) Release 8 (December 2008) and subsequent releases. Further, UE1 114 and UE2 120 and/or the network node 100 can be in communication with other user equipment or mobile devices (not shown) and/or other network nodes (not shown). A "link" is a communications channel that connects two or more devices or nodes. An uplink (UL) 118 refers to a link used for transmission of signals from UE1 114 to the network node 100. A downlink (DL) 116 refers to a link used for transmission of signals from the network node 100 to UE1 114. UL 124 refers to the link used for the transmission of signals from UE2 120 to the network node 100, and DL 122 refers to the link used for the transmission of signals from the network node 100 to UE2 120.

Currently under development by the 3GPP is a standard for 5G wireless communications. As identified in ITU-R IMT-2020, the next generation of radio access technology will support enhanced Mobile Broadband (eMBB), massive Machine Type Communications (mMTC), and Ultra-Reliable and Low Latency Communications (URLLC).

In its development of 5G, the follow up to LTE, the 3GPP has identified user plane latency as an area for improvement. Section 7.5 of 3GPP TR 38.913 V14.1.0 (December 2016), "3rd Generation Partnership Project; Technical Specification Group Radio Access Network; Study on Scenarios and Requirements for Next Generation Access Technologies; (Release 14)", which is incorporated by reference here in its entirety, includes user plane latency as a key performance indicator (KPI) in New Radio (NR), and is quoted in part below:

"The time it takes to successfully deliver an application layer packet/message from the radio protocol layer 2/3 SDU ingress point to the radio protocol layer 2/3 SDU egress point via the radio interface in both uplink and downlink directions, where neither device nor Base Station reception is restricted by DRX.

For URLLC, the target for user plane latency should be 0.5 ms for UL, and 0.5 ms for DL. Furthermore, if possible, the latency should also be low enough to support the use of the next generation access technologies as a wireless transport technology that can be used within the next generation access architecture.

NOTE1: The reliability KPI also provides a latency value with an associated reliability requirement. The value above should be considered an average value and does not have an associated high reliability requirement.

For eMBB, the target for user plane latency should be 4 ms for UL, and 4 ms for DL.

NOTE2: For eMBB value, the evaluation needs to consider all typical delays associated with the transfer of the data packets in an efficient way (e.g. applicable procedural delay when resources are not preallocated, averaged HARQ retransmission delay, impacts of network architecture)."

A general description of numerology and transmission time interval (TTI) durations to be supported by NR may be found in section 5.4.5 of 3GPP TS 38.804 V0.5.1 (March 2017), "3rd Generation Partnership Project; Technical Specification Group Radio Access Network; Study on New Radio Access Technology; Radio Interface Protocol Aspects (Release 14)", which is incorporated by reference in its entirety. Section 5.4.5 is quoted below:

"One numerology corresponds to one subcarrier spacing in the frequency domain. By scaling a basic subcarrier spacing by an integer N, different numerologies can be defined in TR 38.802 [14].

One TTI duration corresponds to a number of consecutive symbols in the time domain in one transmission direction. Different TTI durations can be defined when using different number of symbols (e.g. corresponding to a mini-slot, one slot or several slots in one transmission direction) as described in TS 38.802 [14].

The combination of one numerology and one TTI duration determines how transmission is to be made on the physical layer.

Which numerologies and/or TTI durations a logical channel of a radio bearer is mapped to can be configured and reconfigured via RRC signalling. The mapping is not visible to RLC, i.e. the RLC configuration is per logical channel with no dependency on numerologies and/or TTI durations, and ARQ can operate on any of the numerologies and/or TTI durations the logical channel is configured with.

A single MAC entity can support one or multiple numerologies and/or TTI durations but in order for the mapping to be respected, logical channel prioritization procedure takes into account the mapping of one LCH to one or more numerologies and/or TTI durations.

NOTE: HARQ operation with multiple numerologies and TTI durations is FFS, and it should be discussed and decided by RAN1.

NOTE: Whether any characteristic of the numerology beyond the TTI is visible to MAC is FFS (depending on progress in RAN1)."

Figure 9:
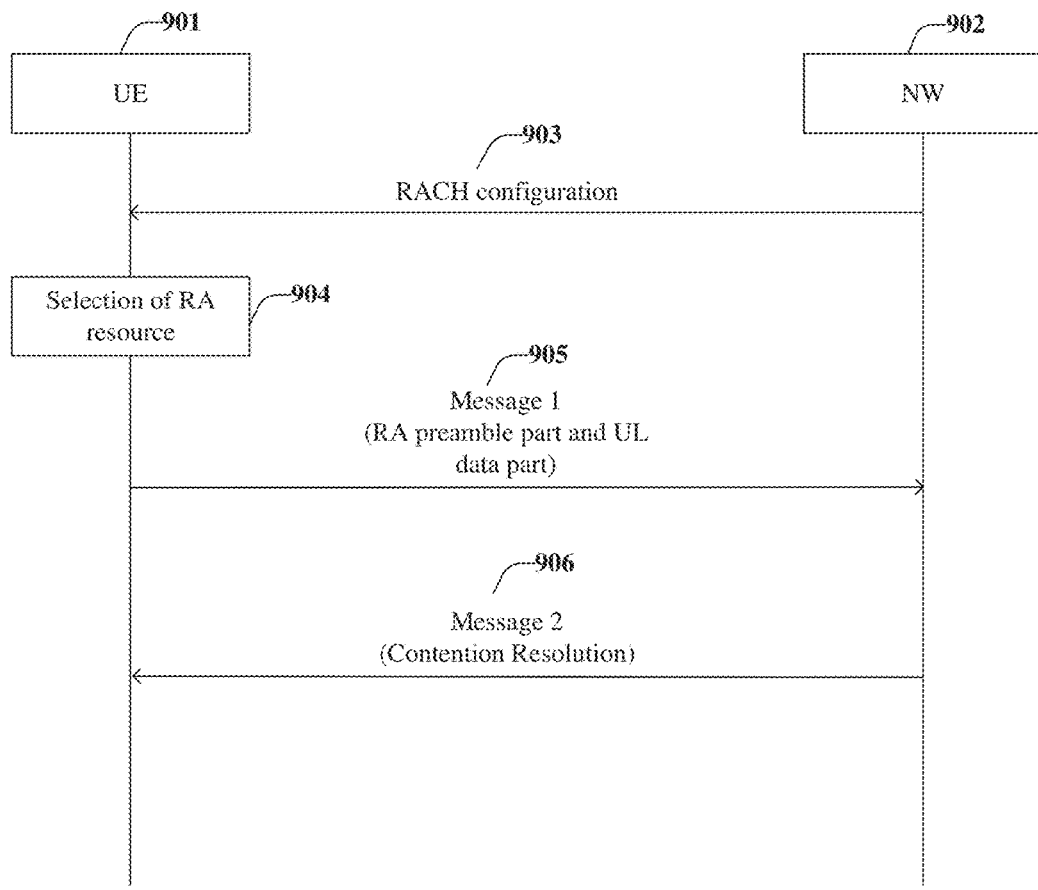
FIG. 9 illustrates an example, non-limiting flow diagram for a 2-step RACH procedure.

Section 9.2 of 3GPP TS 38.804 V0.5.1 provides a general description of random access procedure requirements for NR. Section 9.2 is quoted in part below:

"The random access procedure supports both contention-based and contention free random accesses which follow the steps defined for LTE as illustrated in FIG. 9.2-1. The design of random access procedure needs to support flexible Msg.3 size (as already supported in LTE).

NOTE 1: RAN2 should strive for as much commonality in random access procedure as possible across all use cases.

NOTE 2: It is FFS whether the gNB can be provided with more information (compared to LTE) from the UE on the Msg.3 to provide.

Section 8.3.2.1.2 of 3GPP TR 38.912 V1.0.0 (March 2017), "3rd Generation Partnership Project; Technical Specification Group Radio Access Network; Study on New Radio (NR) Access Technology (Release 14), which is incorporated by reference in its entirety, provides a general description of random access procedure in NR, as does 3GPP TR 38.802 V1.2.0 (February 2017), "3rd Generation Partnership Project; Technical Specification Group Radio Access Network; Study on New Radio Access Technology; Physical Layer Aspects (Release 14)", which is also incorporated by reference in its entirety. Section 8.3.2.1.2 of 3GPP TR 38.912 V1.0.0 is quoted below:

"RACH procedure including RACH preamble (Msg. 1), random access response (Msg. 2), message 3, and message 4 is assumed for NR from physical layer perspective. Random access procedure is supported for both IDLE mode and CONNECTED mode UEs. For 4-step RACH procedure, a RACH transmission occasion is defined as the time-frequency resource on which a PRACH message 1 is transmitted using the configured PRACH preamble format with a single particular tx beam RACH resource is also defined as a time-frequency resource to send RACH preamble. Whether UE needs to transmit one or multiple/repeated preamble within a subset of RACH resources can be informed by broadcast system information, e.g., to cover gNB RX beam sweeping in case of NO Tx/Rx beam correspondence at the gNB.

Regardless of whether Tx/Rx beam correspondence is available or not at gNB at least for multiple beams operation, the following RACH procedure is considered for at least UE in idle mode. Association between one or multiple occasions for DL broadcast channel/signal and a subset of RACH resources is informed to UE by broadcast system information or known to UE. Based on the DL measurement and the corresponding association, UE selects the subset of RACH preamble indices. UE Tx beam(s) for preamble transmission(s) is selected by the UE. During a RACH transmission occasion of single or multiple/repeated preamble(s) as informed by broadcast system information, UE uses the same UE Tx beam. NR at least supports transmission of a single Msg.1 before the end of a monitored RAR window.

At least for the case without gNB Tx/Rx beam correspondence, gNB can configure an association between DL signal/channel, and a subset of RACH resources and/or a subset of preamble indices, for determining Msg2 DL Tx beam. Based on the DL measurement and the corresponding association, UE selects the subset of RACH resources and/or the subset of RACH preamble indices. A preamble index consists of preamble sequence index and OCC index, if OCC is supported. Note that a subset of preambles can be indicated by OCC indices.

Regardless of whether Tx/Rx beam correspondence is available or not at gNB at least for multiple beams operation, at gNB, the DL Tx beam for message 2 can be obtained based on the detected RACH preamble/resource and the corresponding association. UL grant in message 2 may indicate the transmission timing of message 3. As baseline UE behavior, UE assumes single RAR reception within a given RAR window.

At least for UE in idle mode, UL Tx beam for message 3 transmission is determined by UE. UE may use the same UL Tx beam used for message 1 transmission.

Different PRACH configurations will be supported, e.g., considering different numerologies case and whether Tx/Rx beam correspondence is available or not at gNB.

For NR RACH Msg. 1 retransmission at least for multi-beam operation, NR supports power ramping. If UE doesn't change beam, the counter of power ramping keeps increasing. Note that UE may derive the uplink transmit power using the most recent estimate of path loss. Whether UE performs UL Beam switching during retransmissions is up to UE implementation. Note that which beam UE switches to is up to UE implementation."

Section 13 of 3GPP TS 38.804 V0.5.1 provides a general description of network slicing support, and is quoted below:

"Support of Network Slicing relies on the principle that traffic for different slices is handled by different PDU sessions. Network can realise the different network slices by scheduling and also by providing different L1/L2 configurations. UE should be able to provide assistance information for network slice selection in RRC message, if it has been provided by NAS.

NOTE 1: It is FFS whether it is possible to provide different PRACH, access barring and congestion control information for different slices.

NOTE 2: The above agreements and FFS are also applicable for LTE connected to NextGen Core."

An overview of random access procedure is described in 3GPP 36.300 TS V14.1.0 (December 2016), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", which is incorporated here in its entirety. Section 10.1.5 is quoted in part below:

"10.1.5 Random Access Procedure

The random access procedure is characterized by:
  Common procedure for FDD and TDD;
    One procedure irrespective of cell size and the number of serving cells when CA is configured;
The random access procedure is performed for the following events related to the PCell:
  Initial access from RRC_IDLE;
  RRC Connection Re-establishment procedure, except for NB-IoT UE that only uses Control Plane CIoT EPS optimizations, as defined in TS 24.301 [20];
  Handover, except for NB-IoT;
  DL data arrival during RRC_CONNECTED requiring random access procedure:
    E.g. when UL synchronisation status is "non-synchronised".
  UL data arrival during RRC_CONNECTED requiring random access procedure:
    E.g. when UL synchronisation status is "non-synchronised" or there are no PUCCH resources for SR available.
  For positioning purpose during RRC_CONNECTED requiring random access procedure:
    E.g. when timing advance is needed for UE positioning.
The random access procedure is also performed on a SCell to establish time alignment for the corresponding sTAG.
In DC, the random access procedure is also performed on at least PSCell upon SCG addition/modification, if instructed, or upon DL/UL data arrival during RRC_CONNECTED requiring random access procedure. The UE initiated random access procedure is performed only on PSCell for SCG.
Furthermore, the random access procedure takes two distinct forms:
  Contention based (applicable to all six events, but the sixth event for positioning is applicable for NB-IoT only);
  Non-contention based (applicable to only handover, DL data arrival, positioning and obtaining timing advance alignment for a sTAG), except for NB-IoT.
Normal DL/UL transmission can take place after the random access procedure.
An RN supports both contention-based and non-contention-based random access. When an RN performs the random access procedure, it suspends any current RN subframe configuration, meaning it temporarily disregards the RN subframe configuration. The RN subframe configuration is resumed at successful random access procedure completion.

For NB-IoT, the random access procedure is performed on the anchor carrier.

10.1.5.1 Contention based random access procedure

Figure 2:
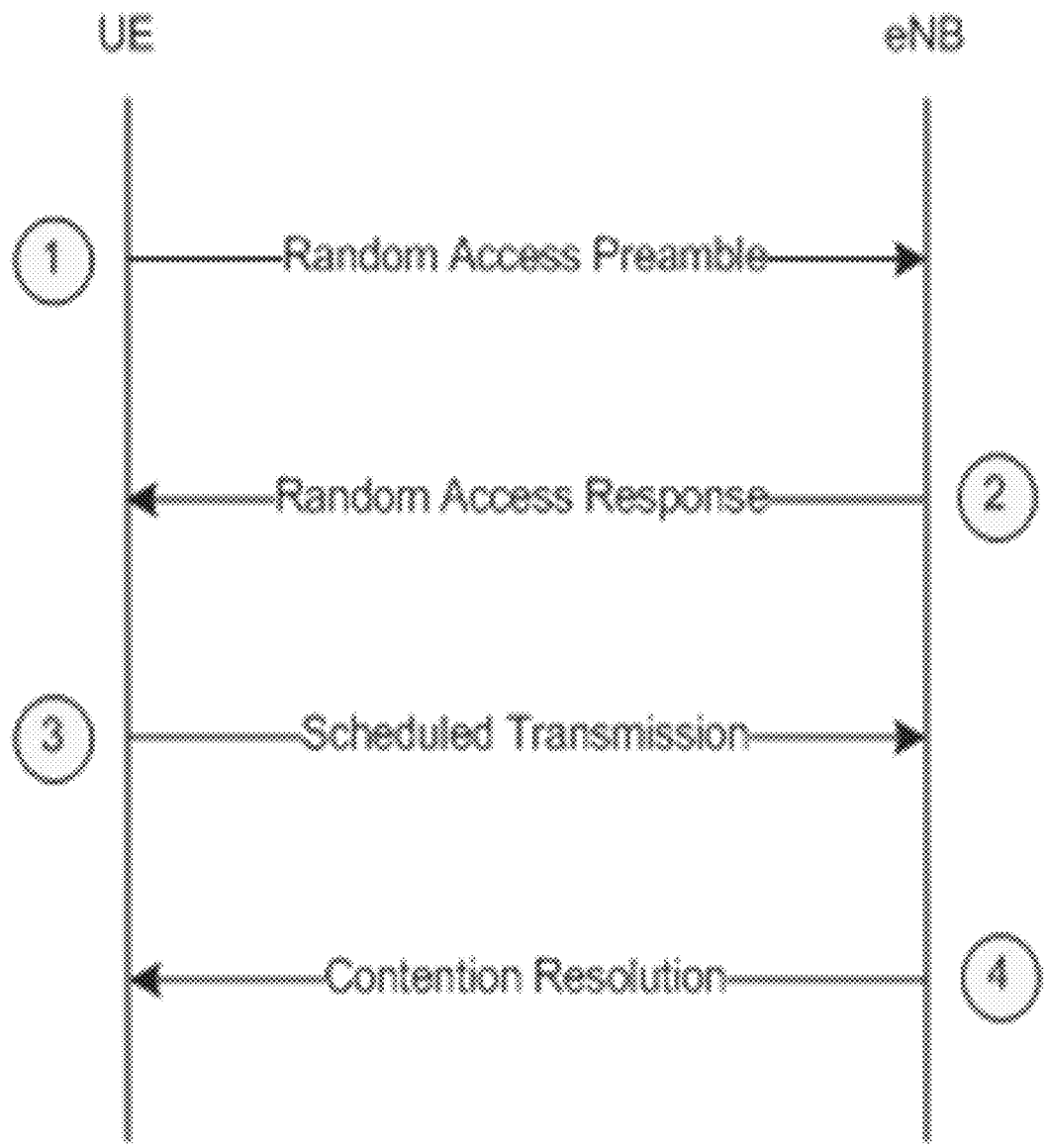
FIG. 2 is a reproduction of FIG. 10.1.5.1-1 from 3GPP 36.300 TS V14.1.0 (December 2016), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)
Figure 10:
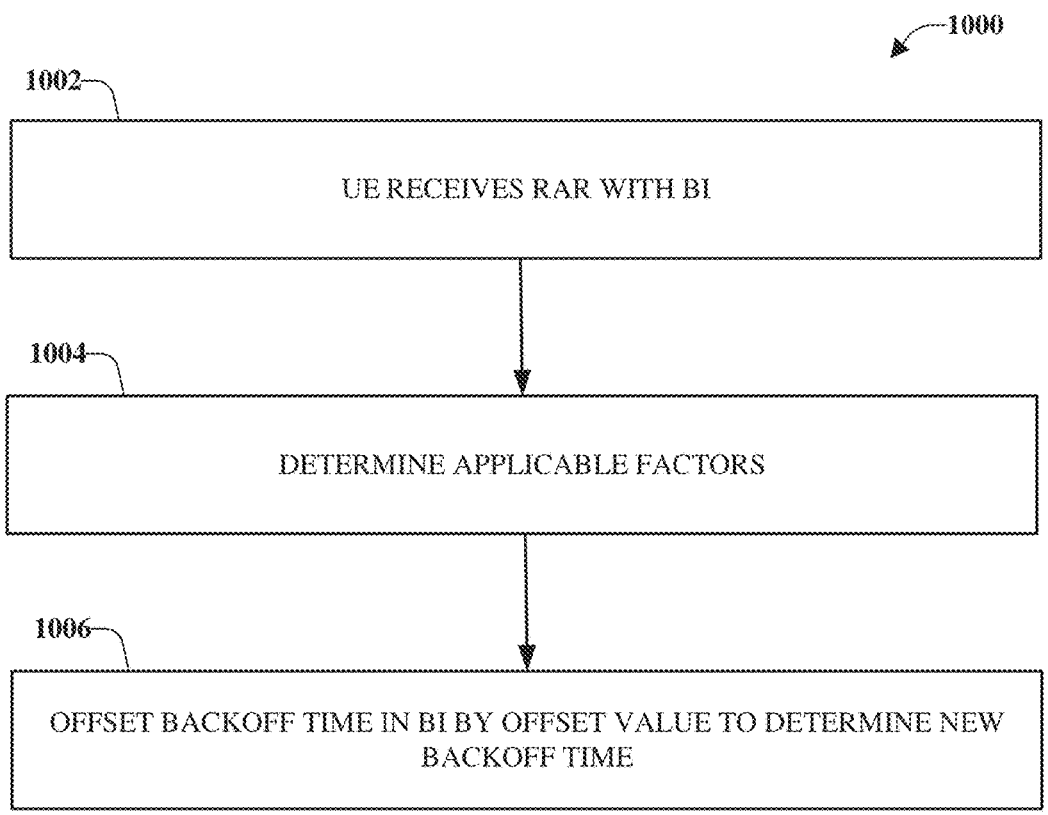
FIG. 10 illustrates an example, non-limiting methodology for adjusting a backoff time by an offset value.

The contention based random access procedure is outlined on FIG. 10.1.5.1-1 below:

[FIG. 2 is a reproduction of FIG. 10.1.5.1-1]

The four steps of the contention based random access procedures are:

1) Random Access Preamble on RACH in uplink:
   There are two possible groups defined and one is optional. If both groups are configured the size of message 3 and the pathloss are used to determine which group a preamble is selected from. The group to which a preamble belongs provides an indication of the size of the message 3 and the radio conditions at the UE. The preamble group information along with the necessary thresholds are broadcast on system information.
2) Random Access Response generated by MAC on DL-SCH:
   Semi-synchronous (within a flexible window of which the size is one or more TTI) with message 1;
   No HARQ;
   Addressed to RA-RNTI on PDCCH;
   Conveys at least RA-preamble identifier, Timing Alignment information for the pTAG, initial UL grant and assignment of Temporary C-RNTI (which may or may not be made permanent upon Contention Resolution);
   Intended for a variable number of UEs in one DL-SCH message.
3) First scheduled UL transmission on UL-SCH:
   Uses HARQ;
   Size of the transport blocks depends on the UL grant conveyed in step 2.
   For initial access:
      Conveys the RRC Connection Request generated by the RRC layer and transmitted via CCCH;
      Conveys at least NAS UE identifier but no NAS message;
      RLC TM: no segmentation.
   For RRC Connection Re-establishment procedure:
      Conveys the RRC Connection Re-establishment Request generated by the RRC layer and transmitted via CCCH;
      RLC TM: no segmentation;
      Does not contain any NAS message.
   After handover, in the target cell:
      Conveys the ciphered and integrity protected RRC Handover Confirm generated by the RRC layer and transmitted via DCCH;
      Conveys the C-RNTI of the UE (which was allocated via the Handover Command);
      Includes an uplink Buffer Status Report when possible.
   For other events:
      Conveys at least the C-RNTI of the UE;
   In the procedure to resume the RRC connection:
      Conveys the RRC Connection Resume Request generated by the RRC layer and transmitted via CCCH;
      Conveys a Resume ID to resume the RRC connection;
   For NB-IoT:
      In the procedure to setup the RRC connection:
         An indication of the amount of data for subsequent transmission(s) on SRB or DRB can be indicated.
4) Contention Resolution on DL:
   Early contention resolution shall be used i.e. eNB does not wait for NAS reply before resolving contention;
   Not synchronised with message 3;
   HARQ is supported;
   Addressed to:
      The Temporary C-RNTI on PDCCH for initial access and after radio link failure;
      The C-RNTI on PDCCH for UE in RRC_CONNECTED.
   HARQ feedback is transmitted only by the UE which detects its own UE identity, as provided in message 3, echoed in the Contention Resolution message;
   For initial access and RRC Connection Re-establishment procedure, no segmentation is used (RLC-TM).

The Temporary C-RNTI is promoted to C-RNTI for a UE which detects RA success and does not already have a C-RNTI; it is dropped by others. A UE which detects RA success and already has a C-RNTI, resumes using its C-RNTI.

When CA is configured, the first three steps of the contention based random access procedures occur on the PCell while contention resolution (step 4) can be cross-scheduled by the PCell.

When DC is configured, the first three steps of the contention based random access procedures occur on the PCell in MCG and PSCell in SCG. When CA is configured in SCG, the first three steps of the contention based random access procedures occur on the PSCell while contention resolution (step 4) can be cross-scheduled by the PSCell.

10.1.5.2 Non-contention based random access procedure

Figure 3:
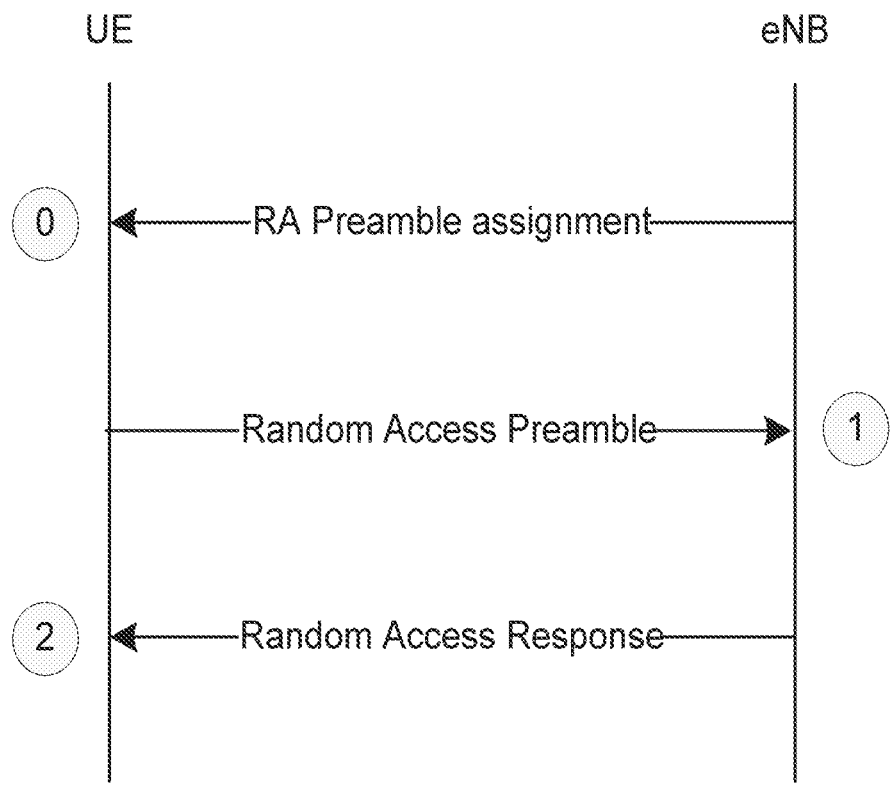
FIG. 3 is a reproduction of FIG. 10.1.5.2-1 from 3GPP 36.300 TS V14.1.0 (December 2016), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)

The non-contention based random access procedure is outlined on FIG. 10.1.5.2-1 below:

[FIG. 3 is a reproduction of FIG. 10.1.5.2-1]

The three steps of the non-contention based random access procedures are:

0) Random Access Preamble assignment via dedicated signalling in DL:
   eNB assigns to UE a non-contention Random Access Preamble (a Random Access Preamble not within the set sent in broadcast signalling).
   Signalled via:
      HO command generated by target eNB and sent via source eNB for handover;
      PDCCH in case of DL data arrival or positioning;
      PDCCH for initial UL time alignment for a sTAG.
1) Random Access Preamble on RACH in uplink:
   UE transmits the assigned non-contention Random Access Preamble.
2) Random Access Response on DL-SCH:
   Semi-synchronous (within a flexible window of which the size is two or more TTIs) with message 1;
   No HARQ;
   Addressed to RA-RNTI on PDCCH;
   Conveys at least:
      Timing Alignment information and initial UL grant for handover;

Timing Alignment information for DL data arrival;

RA-preamble identifier;

Intended for one or multiple UEs in one DL-SCH message.

When performing non-contention based random access on the PCell while CA is configured, the Random Access Preamble assignment via PDCCH of step 0, step 1 and 2 of the non-contention based random access procedure occur on the PCell. In order to establish timing advance for a sTAG, the eNB may initiate a non-contention based random access procedure with a PDCCH order (step 0) that is sent on a scheduling cell of activated SCell of the sTAG. Preamble transmission (step 1) is on the indicated SCell and Random Access Response (step 2) takes place on PCell.

When performing non-contention based random access on the PCell or PSCell while DC is configured, the Random Access Preamble assignment via PDCCH of step 0, step 1 and 2 of the non-contention based random access procedure occur on the corresponding cell. In order to establish timing advance for a sTAG, the eNB may initiate a non-contention based random access procedure with a PDCCH order (step 0) that is sent on a scheduling cell of activated SCell of the sTAG not including PSCell. Preamble transmission (step 1) is on the indicated SCell and Random Access Response (step 2) takes place on PCell for MCG and PSCell for SCG."

Details of random access procedure in LTE, including the mechanism for each step as well as corresponding MAC PDU and parameters are described in 3GPP TS 36.321 V14.0.0 (September 2016), "3rd Generation Partnership Project; Technical Specification Group Radio Access Network; Evolved Universal Terrestrial Radio Access (E-UTRA); Medium Access Control (MAC) protocol specification (Release 14)", which is incorporated by reference here in its entirety.

Section 5.1 of 3GPP TS 36.321 V14.0.0 provides a general description of the random access procedure, and is quoted below:

"5.1 Random Access procedure 5.1.1 Random Access Procedure initialization

The Random Access procedure described in this subclause is initiated by a PDCCH order, by the MAC sublayer itself or by the RRC sublayer. Random Access procedure on an SCell shall only be initiated by a PDCCH order. If a MAC entity receives a PDCCH transmission consistent with a PDCCH order [5] masked with its C-RNTI, and for a specific Serving Cell, the MAC entity shall initiate a Random Access procedure on this Serving Cell. For Random Access on the SpCell a PDCCH order or RRC optionally indicate the ra-PreambleIndex and the ra-PRACH-MaskIndex, except for NB-IoT where the subcarrier index is indicated; and for Random Access on an SCell, the PDCCH order indicates the ra-PreambleIndex with a value different from 000000 and the ra-PRACH-MaskIndex. For the pTAG preamble transmission on PRACH and reception of a PDCCH order are only supported for SpCell. If the UE is an NB-IoT UE and is configured with a non-anchor carrier, perform the Random Access procedure on the anchor carrier.

Before the procedure can be initiated, the following information for related Serving Cell is assumed to be available for UEs other than NB-IoT UEs, BL UEs or UEs in enhanced coverage [8], unless explicitly stated otherwise:

the available set of PRACH resources for the transmission of the Random Access Preamble, prach-ConfigIndex.

the groups of Random Access Preambles and the set of available Random Access Preambles in each group (SpCell only):

The preambles that are contained in Random Access Preambles group A and Random Access Preambles group B are calculated from the parameters numberOfRA-Preambles and sizeOfRA-PreamblesGroupA:

If sizeOfRA-PreamblesGroupA is equal to numberOfRA-Preambles then there is no Random Access Preambles group B. The preambles in Random Access Preamble group A are the preambles 0 to sizeOfRA-PreamblesGroupA−1 and, if it exists, the preambles in Random Access Preamble group B are the preambles sizeOfRA-PreamblesGroupA to numberOfRA-Preambles−1 from the set of 64 preambles as defined in [7].

if Random Access Preambles group B exists, the thresholds, messagePowerOffsetGroupB and messageSizeGroupA, the configured UE transmitted power of the Serving Cell performing the Random Access Procedure, $P_{CMAX,c}$ [10], and the offset between the preamble and Msg3, deltaPreambleMsg3, that are required for selecting one of the two groups of Random Access Preambles (SpCell only).

the RA response window size ra-ResponseWindowSize.

the power-ramping factor powerRampingStep.

the maximum number of preamble transmission preambleTransMax.

the initial preamble power preambleInitialReceivedTargetPower.

the preamble format based offset DELTA_PREAMBLE (see subclause 7.6).

the maximum number of Msg3 HARQ transmissions maxHARQ-Msg3Tx (SpCell only).

the Contention Resolution Timer mac-ContentionResolutionTimer (SpCell only).

NOTE: The above parameters may be updated from upper layers before each Random Access procedure is initiated.

The following information for related Serving Cell is assumed to be available before the procedure can be initiated for NB-IoT UEs, BL UEs or UEs in enhanced coverage [8]:

if the UE is a BL UE or a UE in enhanced coverage:

the available set of PRACH resources associated with each enhanced coverage level supported in the Serving Cell for the transmission of the Random Access Preamble, prach-ConfigIndex.

the groups of Random Access Preambles and the set of available Random Access Preambles in each group (SpCell only):

The preambles that are contained in Random Access Preamble groups for each enhanced coverage level, if it exists, are the preambles firstPreamble to lastPreamble.

If sizeOfRA-PreamblesGroupA is not equal to numberOfRA-Preambles, Random Access Preambles group B exists for all enhanced coverage levels and is calculated as above.

NOTE: If Random Access Preamble group B exists, the eNB should ensure that at least one Random Access Preamble is contained in Random Access Preamble group A and Random Access Preamble group B for all enhanced coverage level.

if the UE is a NB-IoT UE:
  the available set of PRACH resources supported in the Serving Cell, nprach-ParametersList.
  for random access resource selection and preamble transmission:
    a PRACH resource is mapped into an enhanced coverage level.
    each PRACH resource contains a set of nprach-NumSubcarriers subcarriers which can be partitioned into one or two groups for single/multi-tone Msg3 transmission by nprach-SubcarrierMSG3-RangeStart. Each group is referred to as a Random Access Preamble group below in the procedure text.
    a subcarrier is identified by the subcarrier index in the range: [nprach-SubcarrierOffset, nprach-SubcarrierOffset+nprach-NumSubcarriers−1]
    each subcarrier of a Random Access Preamble group corresponds to a Random Access Preamble.
    when the subcarrier index is explicitly sent from the eNB as part of a PDCCH order ra-PreambleIndex shall be set to the signalled subcarrier index.

the mapping of the PRACH resources into enhanced coverage levels is determined according to the following:
  the number of enhanced coverage levels is equal to one plus the number of RSRP thresholds present in RSRP-ThresholdsPrachInfoList.
  each enhanced coverage level has one PRACH resource present in nprach-ParametersList.
  enhanced coverage levels are numbered from 0 and the mapping of PRACH resources to enhanced coverage levels are done in increasing numRepetitionsPerPreambleAttempt order.

the criteria to select PRACH resources based on RSRP measurement per enhanced coverage level supported in the Serving Cell rsrp-ThresholdsPrachInfoList.

the maximum number of preamble transmission attempts per enhanced coverage level supported in the Serving Cell maxNumPreambleAttemptCE.

the number of repetitions required for preamble transmission per attempt for each enhanced coverage level supported in the Serving Cell numRepetitionPerPreambleAttempt.

the configured UE transmitted power of the Serving Cell performing the Random Access Procedure, $P_{CMAX,c}$ [10].

the RA response window size ra-ResponseWindowSize and the Contention Resolution Timer mac-ContentionResolutionTimer (SpCell only) per enhanced coverage level supported in the Serving Cell.

the power-ramping factor powerRampingStep.

the maximum number of preamble transmission preambleTransMax-CE.

the initial preamble power preambleInitialReceivedTargetPower.

the preamble format based offset DELTA_PREAMBLE (see subclause 7.6). For NB-IoT the DELTA_PREAMBLE is set to 0.

The Random Access procedure shall be performed as follows:
  Flush the Msg3 buffer;
  set the PREAMBLE_TRANSMISSION_COUNTER to 1;
  if the UE is an NB-IoT UE, a BL UE or a UE in enhanced coverage:
    set the PREAMBLE_TRANSMISSION_COUNTER CE to 1;
    if the starting enhanced coverage level, or for NB-IoT the initial number of PRACH repetitions, has been indicated in the PDCCH order which initiated the Random Access procedure, or if the starting enhanced coverage level has been provided by upper layers:
      the MAC entity considers itself to be in that enhanced coverage level regardless of the measured RSRP;
    else:
      if the RSRP threshold of enhanced coverage level 3 is configured by upper layers in rsrp-ThresholdsPrachInfoList and the measured RSRP is less than the RSRP threshold of enhanced coverage level 3 and the UE is capable of enhanced coverage level 3 then:
        the MAC entity considers to be in enhanced coverage level 3;
      else if the RSRP threshold of enhanced coverage level 2 configured by upper layers in rsrp-ThresholdsPrachInfoList and the measured RSRP is less than the RSRP threshold of enhanced coverage level 2 and the UE is capable of enhanced coverage level 2 then:
        the MAC entity considers to be in enhanced coverage level 2;
      else if the measured RSRP is less than the RSRP threshold of enhanced coverage level 1 as configured by upper layers in rsrp-ThresholdsPrachInfoList then:
        the MAC entity considers to be in enhanced coverage level 1;
      else:
        the MAC entity considers to be in enhanced coverage level 0;
  set the backoff parameter value to 0 ms;
  for the RN, suspend any RN subframe configuration;
  proceed to the selection of the Random Access Resource (see subclause 5.1.2).
  NOTE: There is only one Random Access procedure ongoing at any point in time in a MAC entity. If the MAC entity receives a request for a new Random Access procedure while another is already ongoing in the MAC entity, it is up to UE implementation whether to continue with the ongoing procedure or start with the new procedure.

5.1.2 Random Access Resource selection

The Random Access Resource selection procedure shall be performed as follows:
  If, except for NB-IoT, ra-PreambleIndex (Random Access Preamble) and ra-PRACH-MaskIndex (PRACH Mask Index) have been explicitly signalled and ra-PreambleIndex is not 000000:
    the Random Access Preamble and the PRACH Mask Index are those explicitly signalled;

else, for NB-IoT, if ra-PreambleIndex (Random Access Preamble) and PRACH resource have been explicitly signalled:
   the PRACH resource is that explicitly signalled;
   if the ra-PreambleIndex signalled is not 000000:
      the Random Access Preamble is set to nprach-SubcarrierOffset+(ra-PreambleIndex modulo nprach-NumSubcarriers), where nprach-SubcarrierOffset and nprach-NumSubcarriers are parameters in the currently used PRACH resource.
   else:
      select the Random Access Preamble group according to the PRACH resource and the support for multi-tone Msg3 transmission.
      randomly select a Random Access Preamble within the selected group.
else the Random Access Preamble shall be selected by the MAC entity as follows:
   If Msg3 has not yet been transmitted, the MAC entity shall, for NB-IoT UEs, BL UEs or UEs in enhanced coverage:
      expect for NB-IoT, select the Random Access Preambles group and the PRACH resource corresponding to the selected enhanced coverage level;
      for NB-IoT, select the PRACH resource corresponding to the selected enhanced coverage level, and select the Random Access Preambles group corresponding to the PRACH resource and the support for multi-tone Msg3 transmission;
   If Msg3 has not yet been transmitted, the MAC entity shall, except for BL UEs or UEs in enhanced coverage in case preamble group B does not exists, or for NB-IoT UEs:
      if Random Access Preambles group B exists and any of the following events occur:
         the potential message size (UL data available for transmission plus MAC header and, where required, MAC control elements) is greater than messageSizeGroupA and the pathloss is less than $P_{CMAX,c}$ (of the Serving Cell performing the Random Access Procedure)−preambleInitialReceivedTargetPower−deltaPreambleMsg3−messagePowerOffsetGroupB;
         the Random Access procedure was initiated for the CCCH logical channel and the CCCH SDU size plus MAC header is greater than messageSizeGroupA;
         select the Random Access Preambles group B;
      else:
         select the Random Access Preambles group A.
   else, if Msg3 is being retransmitted, the MAC entity shall:
      select the same group of Random Access Preambles as was used for the preamble transmission attempt corresponding to the first transmission of Msg3.
   randomly select a Random Access Preamble within the selected group. The random function shall be such that each of the allowed selections can be chosen with equal probability;
   except for NB-IoT, set PRACH Mask Index to 0.
determine the next available subframe containing PRACH permitted by the restrictions given by the prach-ConfigIndex (except for NB-IoT), the PRACH Mask Index (except for NB-IoT, see subclause 7.3), physical layer timing requirements [2] and in case of NB-IoT, the subframes occupied by PRACH resources related to a higher enhanced coverage level (a MAC entity may take into account the possible occurrence of measurement gaps when determining the next available PRACH subframe);
if the transmission mode is TDD and the PRACH Mask Index is equal to zero:
   if ra-PreambleIndex was explicitly signalled and it was not 000000 (i.e., not selected by MAC):
      randomly select, with equal probability, one PRACH from the PRACHs available in the determined subframe.
   else:
      randomly select, with equal probability, one PRACH from the PRACHs available in the determined subframe and the next two consecutive subframes.
else:
   determine a PRACH within the determined subframe in accordance with the requirements of the PRACH Mask Index, if any.
for NB-IoT UEs, BL UEs or UEs in enhanced coverage, select the ra-ResponseWindowSize and mac-ContentionResolutionTimer corresponding to the selected enhanced coverage level and PRACH.
proceed to the transmission of the Random Access Preamble (see subclause 5.1.3).
5.1.3 Random Access Preamble transmission
The random-access procedure shall be performed as follows:
   set PREAMBLE_RECEIVED_TARGET_POWER to preambleInitialReceivedTargetPower+DELTA_PREAMBLE+(PREAMBLE_TRANSMISSION_COUNTER−1)*powerRampingStep;
   if the UE is a BL UE or a UE in enhanced coverage:
      the PREAMBLE_RECEIVED_TARGET_POWER is set to: PREAMBLE_RECEIVED_TARGET_POWER−10*log 10(numRepetitionPerPreambleAttempt);
   if NB-IoT:
      for enhanced coverage level 0, the PREAMBLE_RECEIVED_TARGET_POWER is set to: PREAMBLE_RECEIVED_TARGET_POWER−10*log 10(numRepetitionPerPreambleAttempt)
      for other enhanced coverage levels, the PREAMBLE_RECEIVED_TARGET_POWER is set corresponding to the max UE output power;
   if the UE is an NB-IoT UE, a BL UE or a UE in enhanced coverage:
      instruct the physical layer to transmit a preamble with the number of repetitions required for preamble transmission corresponding to the selected preamble group (i.e., numRepetitionPerPreambleAttempt) using the selected PRACH corresponding to the selected enhanced coverage level, corresponding RA-RNTI, preamble index or for NB-IoT subcarrier index, and PREAMBLE_RECEIVED_TARGET_POWER.
   else:
      instruct the physical layer to transmit a preamble using the selected PRACH, corresponding RA-RNTI, preamble index and PREAMBLE_RECEIVED_TARGET_POWER.

5.1.4 Random Access Response reception

Once the Random Access Preamble is transmitted and regardless of the possible occurrence of a measurement gap or a Sidelink Discovery Gap for Transmission or a Sidelink Discovery Gap for Reception, the MAC entity shall monitor the PDCCH of the SpCell for Random Access Response(s) identified by the RA-RNTI defined below, in the RA Response window which starts at the subframe that contains the end of the preamble transmission [7] plus three subframes and has length ra-ResponseWindowSize. If the UE is a BL UE or a UE in enhanced coverage, RA Response window starts at the subframe that contains the end of the last preamble repetition plus three subframes and has length ra-ResponseWindowSize for the corresponding coverage level. If the UE is an NB-IoT UE, in case the number of NPRACH repetitions is greater than or equal to 64, RA Response window starts at the subframe that contains the end of the last preamble repetition plus 41 subframes and has length ra-ResponseWindowSize for the corresponding coverage level, and in case the number of NPRACH repetitions is less than 64, RA Response window starts at the subframe that contains the end of the last preamble repetition plus 4 subframes and has length ra-ResponseWindowSize for the corresponding coverage level. The RA-RNTI associated with the PRACH in which the Random Access Preamble is transmitted, is computed as:

$$RA\text{-}RNTI = 1 + t\_id + 10 * f\_id$$

where t_id is the index of the first subframe of the specified PRACH ($0 \leq t\_id < 10$), and f_id is the index of the specified PRACH within that subframe, in ascending order of frequency domain ($0 \leq f\_id < 6$) except for NB-IoT UEs, BL UEs or UEs in enhanced coverage. If the PRACH resource is on a TDD carrier, the f_id is set to $f_{RA}$, where $f_{RA}$ is defined in Section 5.7.1 of [7].

For BL UEs and UEs in enhanced coverage, RA-RNTI associated with the PRACH in which the Random Access Preamble is transmitted, is computed as:

$$RA\text{-}RNTI = 1 + t\_id + 10 * f\_id + 60 * (SFN\_id \bmod (W\max/10))$$

where t_id is the index of the first subframe of the specified PRACH ($0 \leq t\_id < 10$), f_id is the index of the specified PRACH within that subframe, in ascending order of frequency domain ($0 \leq f\_id < 6$), SFN_id is the index of the first radio frame of the specified PRACH, and Wmax is 400, maximum possible RAR window size in subframes for BL UEs or UEs in enhanced coverage. If the PRACH resource is on a TDD carrier, the f_id is set to $f_{PA}$, where $f_{RA}$ is defined in Section 5.7.1 of [7].

For NB-IoT UEs, the RA-RNTI associated with the PRACH in which the Random Access Preamble is transmitted, is computed as:

$$RA\text{-}RNTI = 1 + \mathrm{floor}(SFN\_id/4)$$

where SFN_id is the index of the first radio frame of the specified PRACH.

The MAC entity may stop monitoring for Random Access Response(s) after successful reception of a Random Access Response containing Random Access Preamble identifiers that matches the transmitted Random Access Preamble.

If a downlink assignment for this TTI has been received on the PDCCH for the RA-RNTI and the received TB is successfully decoded, the MAC entity shall regardless of the possible occurrence of a measurement gap or a Sidelink Discovery Gap for Transmission or a Sidelink Discovery Gap for Reception:

if the Random Access Response contains a Backoff Indicator subheader:
  set the backoff parameter value as indicated by the BI field of the Backoff Indicator subheader and Table 7.2-1, except for NB-IoT where the value from Table 7.2-2 is used.
else, set the backoff parameter value to 0 ms.
if the Random Access Response contains a Random Access Preamble identifier corresponding to the transmitted Random Access Preamble (see subclause 5.1.3), the MAC entity shall:
  consider this Random Access Response reception successful and apply the following actions for the serving cell where the Random Access Preamble was transmitted:
    process the received Timing Advance Command (see subclause 5.2);
    indicate the preambleInitialReceivedTargetPower and the amount of power ramping applied to the latest preamble transmission to lower layers (i.e., (PREAMBLE_TRANSMISSION_COUNTER−1)*powerRampingStep);
    process the received UL grant value and indicate it to the lower layers;
    if ra-PreambleIndex was explicitly signalled and it was not 000000 (i.e., not selected by MAC):
      consider the Random Access procedure successfully completed.
    else, if the Random Access Preamble was selected by the MAC entity:
      set the Temporary C-RNTI to the value received in the Random Access Response message no later than at the time of the first transmission corresponding to the UL grant provided in the Random Access Response message;
      if this is the first successfully received Random Access Response within this Random Access procedure:
        if the transmission is not being made for the CCCH logical channel, indicate to the Multiplexing and assembly entity to include a C-RNTI MAC control element in the subsequent uplink transmission;
        obtain the MAC PDU to transmit from the "Multiplexing and assembly" entity and store it in the Msg3 buffer.
NOTE: When an uplink transmission is required, e.g., for contention resolution, the eNB should not provide a grant smaller than 56 bits (or 88 bits for NB-IoT) in the Random Access Response.
NOTE: If within a Random Access procedure, an uplink grant provided in the Random Access Response for the same group of Random Access Preambles has a different size than the first uplink grant allocated during that Random Access procedure, the UE behavior is not defined.

If no Random Access Response is received within the RA Response window, or if none of all received Random Access Responses contains a Random Access Preamble identifier corresponding to the transmitted Random Access Preamble, the Random Access Response reception is considered not successful and the MAC entity shall:

if the notification of power ramping suspension has not
    been received from lower layers:
    increment PREAMBLE_TRANSMIS-
        SION_COUNTER by 1;
if the UE is an NB-IoT UE, a BL UE or a UE in
    enhanced coverage:
    if PREAMBLE_TRANSMISSION_COUNTER=
        preambleTransMax-CE+1:
        if the Random Access Preamble is transmitted on
            the SpCell:
            indicate a Random Access problem to upper
                layers;
            if NB-IoT:
                consider the Random Access procedure unsuc-
                    cessfully completed;
else:
    if PREAMBLE_TRANSMISSION_COUNTER=
        preambleTransMax+1:
        if the Random Access Preamble is transmitted on
            the SpCell:
            indicate a Random Access problem to upper
                layers;
        if the Random Access Preamble is transmitted on
            an SCell:
            consider the Random Access procedure unsuc-
                cessfully completed.
if in this Random Access procedure, the Random
    Access Preamble was selected by MAC:
    based on the backoff parameter, select a random
        backoff time according to a uniform distribution
        between 0 and the Backoff Parameter Value;
    delay the subsequent Random Access transmission
        by the backoff time;
if the UE is an NB-IoT UE, a BL UE or a UE in
    enhanced coverage:
    increment PREAMBLE_TRANSMIS-
        SION_COUNTER CE by 1;
    if PREAMBLE_TRANSMISSION_COUNTER
        CE=maxNumPreambleAttemptCE for the corre-
        sponding enhanced coverage level+1:
        reset PREAMBLE_TRANSMISSION_COUN-
            TER CE;
        consider to be in the next enhanced coverage
            level, if it is supported by the Serving Cell and
            the UE, otherwise stay in the current enhanced
            coverage level;
        select the Random Access Preambles group, ra-
            ResponseWindowSize, mac-ContentionResolu-
            tionTimer, and PRACH resource corresponding
            to the selected enhanced coverage level;
        if the UE is an NB-IoT UE:
            if the Random Access Procedure was initiated
                by a PDCCH order:
    consider the PRACH resource corresponding to the
        selected enhanced coverage level as explicitly sig-
        nalled;
    proceed to the selection of a Random Access Resource
        (see subclause 5.1.2).

5.1.5 Contention Resolution

Contention Resolution is based on either C-RNTI on
PDCCH of the SpCell or UE Contention Resolution
Identity on DL-SCH. If the UE is an NB-IoT UE, a BL
UE or a UE in enhanced coverage, the MAC entity
shall use the mac-ContentionResolutionTimer for the
corresponding enhanced coverage level if it exists.

Once Msg3 is transmitted, the MAC entity shall:
    start mac-ContentionResolutionTimer and restart mac-
        ContentionResolution Timer at each HARQ retrans-
        mission;
    regardless of the possible occurrence of a measurement
        gap or Sidelink Discovery Gap for Reception, moni-
        tor the PDCCH until mac-ContentionResolution-
        Timer expires or is stopped;
    if notification of a reception of a PDCCH transmission
        is received from lower layers, the MAC entity shall:
        if the C-RNTI MAC control element was included in
            Msg3:
            if the Random Access procedure was initiated by
                the MAC sublayer itself or by the RRC sublayer
                and the PDCCH transmission is addressed to
                the C-RNTI and contains an UL grant for a new
                transmission; or
            if the Random Access procedure was initiated by
                a PDCCH order and the PDCCH transmission
                is addressed to the C-RNTI:
                consider this Contention Resolution successful;
                stop mac-ContentionResolutionTimer;
                discard the Temporary C-RNTI;
                if the UE is an NB-IoT UE and is configured
                    with a non-anchor carrier:
                    the UL grant or DL assignment contained in the
                        PDCCH transmission on the anchor carrier is
                        valid only for the non-anchor carrier.
                consider this Random Access procedure suc-
                    cessfully completed.
        else if the CCCH SDU was included in Msg3 and the
            PDCCH transmission is addressed to its Tempo-
            rary C-RNTI:
            if the MAC PDU is successfully decoded:
                stop mac-ContentionResolutionTimer;
                if the MAC PDU contains a UE Contention
                    Resolution Identity MAC control element; and
                if the UE Contention Resolution Identity
                    included in the MAC control element matches
                    the 48 first bits of the CCCH SDU transmitted
                    in Msg3:
                    consider this Contention Resolution successful
                        and finish the disassembly and demultiplexing
                        of the MAC PDU;
                    set the C-RNTI to the value of the Temporary
                        C-RNTI;
                    discard the Temporary C-RNTI;
                    consider this Random Access procedure suc-
                        cessfully completed.
                else
                    discard the Temporary C-RNTI;
                    consider this Contention Resolution not suc-
                        cessful and discard the successfully decoded
                        MAC PDU.
    if mac-ContentionResolutionTimer expires:
        discard the Temporary C-RNTI;
        consider the Contention Resolution not successful.
    if the Contention Resolution is considered not success-
        ful the MAC entity shall:
        flush the HARQ buffer used for transmission of the
            MAC PDU in the Msg3 buffer;
        if the notification of power ramping suspension has
            not been received from lower layers:
            increment PREAMBLE_TRANSMIS-
                SION_COUNTER by 1;

if the UE is an NB-IoT UE, a BL UE or a UE in enhanced coverage:
  if PREAMBLE_TRANSMISSION_COUNTER=preambleTransMax-CE+1:
    indicate a Random Access problem to upper layers.
    if NB-IoT:
      consider the Random Access procedure unsuccessfully completed;
else:
  if PREAMBLE_TRANSMISSION_COUNTER=preambleTransMax+1:
    indicate a Random Access problem to upper layers.
  based on the backoff parameter, select a random backoff time according to a uniform distribution between 0 and the Backoff Parameter Value;
  delay the subsequent Random Access transmission by the backoff time;
    proceed to the selection of a Random Access Resource (see subclause 5.1.2).
5.1.6 Completion of the Random Access procedure
At completion of the Random Access procedure, the MAC entity shall:
  discard explicitly signalled ra-PreambleIndex and ra-PRACH-MaskIndex, if any;
  flush the HARQ buffer used for transmission of the MAC PDU in the Msg3 buffer.
In addition, the RN shall resume the suspended RN subframe configuration, if any."

Figure 4:
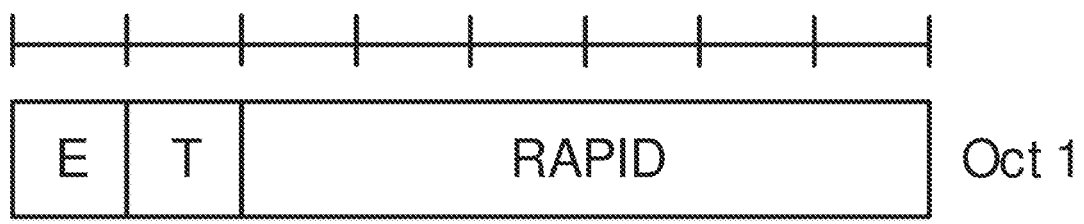
FIG. 4 is a reproduction of FIG. 6.1.5-1 from 3GPP TS 36.321 V14.0.0 (September 2016), "3rd Generation Partnership Project; Technical Specification Group Radio Access Network; Evolved Universal Terrestrial Radio Access (E-UTRA); Medium Access Control (MAC) protocol specification (Release 14)"
Figure 5:
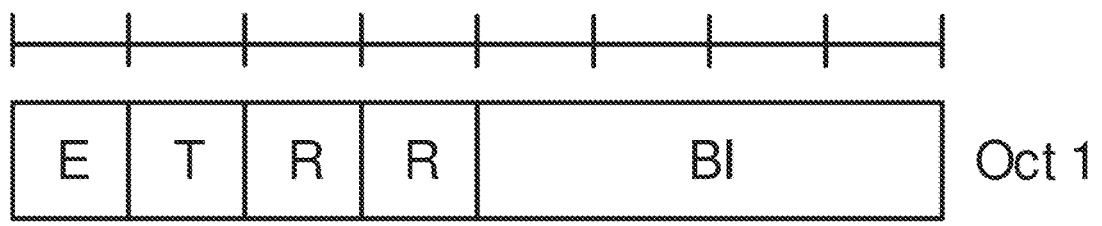
FIG. 5 is a reproduction of FIG. 6.1.5-2 from 3GPP TS 36.321 V14.0.0 (September 2016), "3rd Generation Partnership Project; Technical Specification Group Radio Access Network; Evolved Universal Terrestrial Radio Access (E-UTRA); Medium Access Control (MAC) protocol specification (Release 14)"
Figure 6:
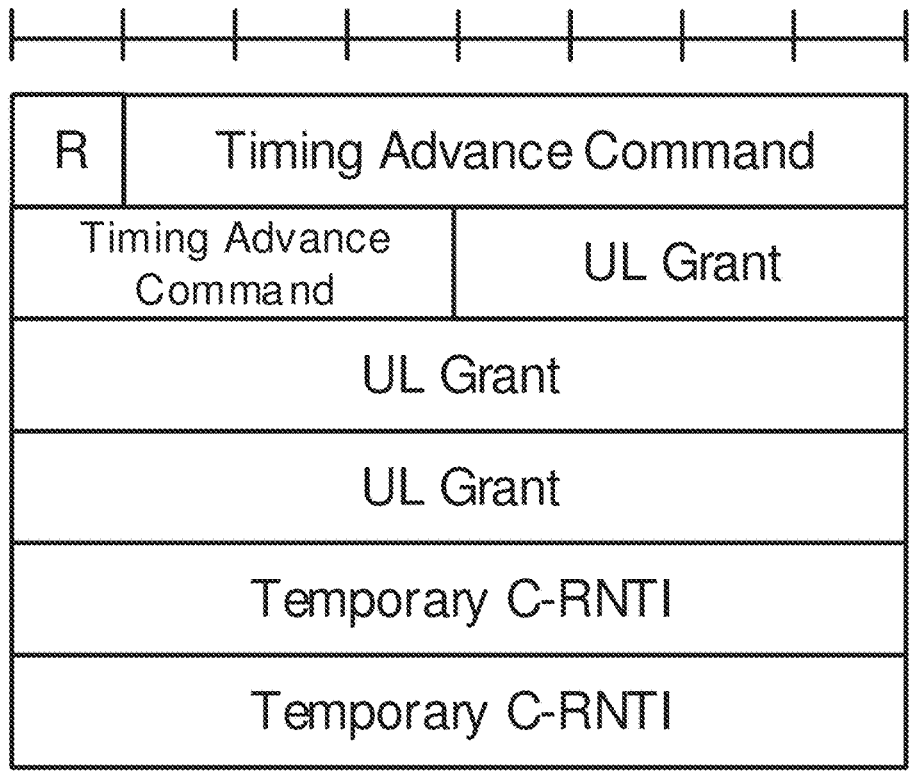
FIG. 6 is a reproduction of FIG. 6.1.5-3 from 3GPP TS 36.321 V14.0.0 (September 2016), "3rd Generation Partnership Project; Technical Specification Group Radio Access Network; Evolved Universal Terrestrial Radio Access (E-UTRA); Medium Access Control (MAC) protocol specification (Release 14)"
Figure 7:
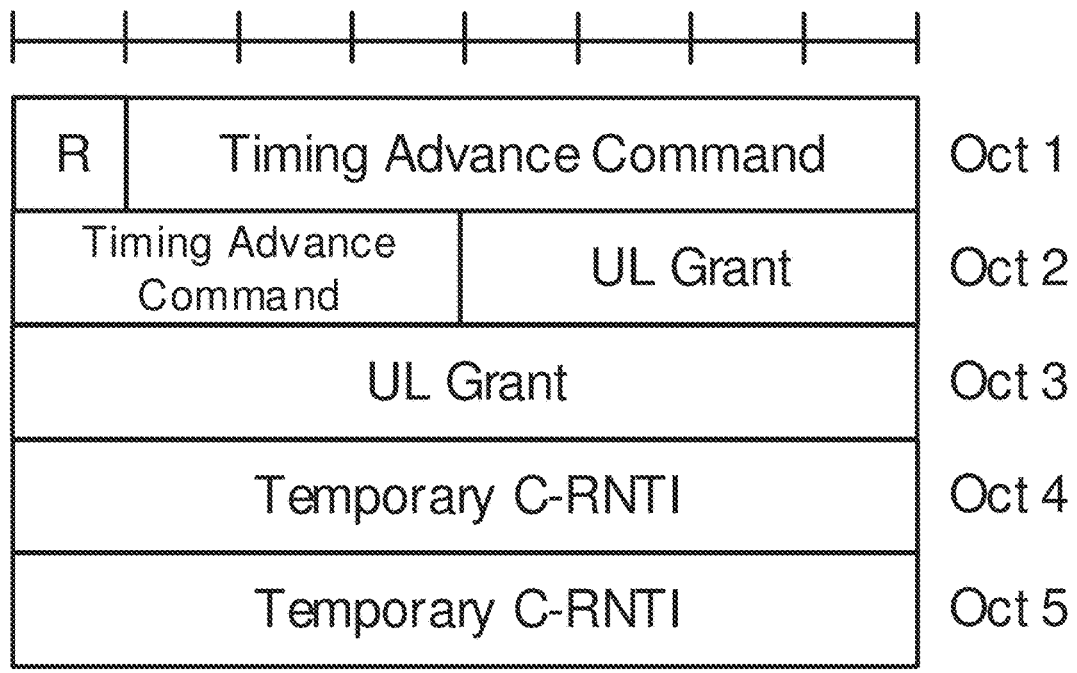
FIG. 7 is a reproduction of FIG. 6.1.5-3a from 3GPP TS 36.321 V14.0.0 (September 2016), "3rd Generation Partnership Project; Technical Specification Group Radio Access Network; Evolved Universal Terrestrial Radio Access (E-UTRA); Medium Access Control (MAC) protocol specification (Release 14)"
Figure 8:
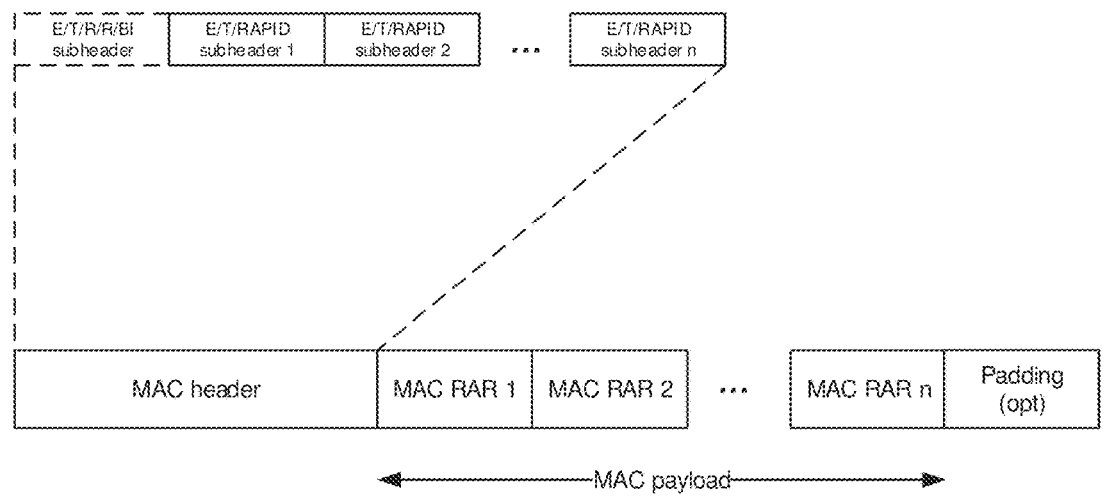
FIG. 8 is a reproduction of FIG. 6.1.5-4 from 3GPP TS 36.321 V14.0.0 (September 2016), "3rd Generation Partnership Project; Technical Specification Group Radio Access Network; Evolved Universal Terrestrial Radio Access (E-UTRA); Medium Access Control (MAC) protocol specification (Release 14)"

Section 6.1.5 of 3GPP TS 36.321 V14.0.0 provides a general description of a MAC PDU for a random access response, and is quoted below:

"A MAC PDU consists of a MAC header and zero or more MAC Random Access Responses (MAC RAR) and optionally padding as described in FIG. 6.1.5-4.
The MAC header is of variable size.
A MAC PDU header consists of one or more MAC PDU subheaders; each subheader corresponding to a MAC RAR except for the Backoff Indicator subheader. If included, the Backoff Indicator subheader is only included once and is the first subheader included within the MAC PDU header.
A MAC PDU subheader consists of the three header fields E/T/RAPID (as described in FIG. 6.1.5-1) but for the Backoff Indicator subheader which consists of the five header field E/T/R/R/BI (as described in FIG. 6.1.5-2).
A MAC RAR consists of the four fields R/Timing Advance Command/UL Grant/Temporary C-RNTI (as described in FIGS. 6.1.5-3 and 6.1.5-3a). For BL UEs and UEs in enhanced coverage in enhanced coverage level 2 or 3 (see subclause 6.2 in [2]) the MAC RAR in FIG. 6.1.5-3a is used, otherwise the MAC RAR in FIG. 6.1.5-3 is used.
Padding may occur after the last MAC RAR. Presence and length of padding is implicit based on TB size, size of MAC header and number of RARs.
[FIG. 4 is a reproduction of FIG. 6.1.5-1]
[FIG. 5 is a reproduction of FIG. 6.1.5-2]
[FIG. 6 is a reproduction of FIG. 6.1.5-3]
[FIG. 7 is a reproduction of FIG. 6.1.5-3a]
[FIG. 8 is a reproduction of FIG. 6.1.5-4]"

Sections 6.2.2 and 6.2.3 of 3GPP TS 36.321V14.0.0 provides a general description of the MAC header and payload for a Random Access Response, and is quoted below:

"6.2.2 MAC header for Random Access Response
The MAC header is of variable size and consists of the following fields:
  E: The Extension field is a flag indicating if more fields are present in the MAC header or not. The E field is set to "1" to indicate at least another set of E/T/RAPID fields follows. The E field is set to "0" to indicate that a MAC RAR or padding starts at the next byte;
  T: The Type field is a flag indicating whether the MAC subheader contains a Random Access ID or a Backoff Indicator. The T field is set to "0" to indicate the presence of a Backoff Indicator field in the subheader (BI). The T field is set to "1" to indicate the presence of a Random Access Preamble ID field in the subheader (RAPID);
  R: Reserved bit, set to "0";
  BI: The Backoff Indicator field identifies the overload condition in the cell. The size of the BI field is 4 bits;
  RAPID: The Random Access Preamble IDentifier field identifies the transmitted Random Access Preamble (see subclause 5.1.3). The size of the RAPID field is 6 bits.
The MAC header and subheaders are octet aligned.
  NOTE: For NB-IoT, the Random Access Preamble IDentifier field corresponds to the start subcarrier index.
6.2.3 MAC payload for Random Access Response
The MAC RAR is of fixed size and consists of the following fields:
  R: Reserved bit, set to "0";
  Timing Advance Command: The Timing Advance Command field indicates the index value $T_A$ (0, 1, 2 . . . 1282) used to control the amount of timing adjustment that the MAC entity has to apply (see subclause 4.2.3 of [2]). The size of the Timing Advance Command field is 11 bits;
  UL Grant: The Uplink Grant field indicates the resources to be used on the uplink (see subclause 6.2 of [2]). The size of the UL Grant field is 20 bits, except for BL UEs and UEs in enhanced coverage in enhanced coverage level 2 or 3, where the size of the UL grant field is 12 bits.
  Temporary C-RNTI: The Temporary C-RNTI field indicates the temporary identity that is used by the MAC entity during Random Access. The size of the Temporary C-RNTI field is 16 bits.
The MAC RAR is octet aligned."

Section 7.2 of 3GPP TS 36.321V14.0.0 provides backoff parameter values in LTE, and is quoted below:

"7.2 Backoff Parameter values
Backoff Parameter values are presented in Table 7.2-1 except for NB-IoT where Table 7.2-2 shall be used.

TABLE 7.2-1

Backoff Parameter values.

| Index | Backoff Parameter value (ms) |
|---|---|
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |

TABLE 7.2-1-continued

Backoff Parameter values.

| Index | Backoff Parameter value (ms) |
|---|---|
| 9 | 240 |
| 10 | 320 |
| 11 | 480 |
| 12 | 960 |
| 13 | Reserved |
| 14 | Reserved |
| 15 | Reserved |

The reserved values of the backoff parameter if received by the current release version UEs shall be taken as 960 ms.

TABLE 7.2-2

Backoff Parameter values for NB-IoT.

| Index | Backoff Parameter value (ms) |
|---|---|
| 0 | 0 |
| 1 | 256 |
| 2 | 512 |
| 3 | 1024 |
| 4 | 2048 |
| 5 | 4096 |
| 6 | 8192 |
| 7 | 16384 |
| 8 | 32768 |
| 9 | 65536 |
| 10 | 131072 |
| 11 | 262144 |
| 12 | 524288 |
| 13 | Reserved |
| 14 | Reserved |
| 15 | Reserved |

The reserved values of the backoff parameter if received by the current release version NB-IoT UEs shall be taken as 524288 ms."

Reducing latency is an important improvement between different generations or releases of a protocol, improving efficiency as well as meeting new applications requirements, e.g., real-time service. One possible option that has been proposed is to reduce the 4-step Random Access Channel (RACH) procedure in LTE to two steps. Discussion of this proposal may be found in 3GPP documents R2-1700024, "Consideration on fallback of 2-step RACH procedure" and R2-1700356, "Consideration on use cases of 2-step RACH procedure", each of which is incorporated here in its entirety. It will be appreciated that, where features in LTE are referenced or cited (e.g., RACH, Random Access Response), analogous or equivalent functionality (whether or not using the same nomenclature or terminology) may be applicable in NR within the scope of this disclosure.

Turning to FIG. 9, illustrated is an example, non-limiting flow diagram for a 2-step RACH procedure. In contrast to the 4-step procedure illustrated in FIG. 2, involving the transmission of four messages, the 2-step procedure depicted in FIG. 10 requires only two messages. Initially, network node (NW) 902 transmits RACH configuration 903 to user equipment (UE) 901. The RACH configuration 903 may include a Random Access (RA) preamble. Each RA preamble (also referred to as RACH preamble) is configured with an associated UL resource. Preferentially, the UE 901 has available to it RACH configuration and Physical Random Access Channel (PRACH) resource configuration. At Step 904, UE 901 selects a RA resource for the RACH procedure. UE 901 subsequently transmits Message 1 (Msg1) 905 to NW 902. Msg1 905 comprises two parts; an RA preamble part and a data part. The RA preamble part of Msg1 905 is transmitted via a PRACH resource, similar to RA preamble transmission in the 4-step RACH procedure.

The data part of Msg1 905 is transmitted to NW 902 via the UL resource associated with the selected RA preamble. The content of the data part of Msg1 905 is similar to the content of message 3 (Msg3) in the 4-step RACH procedure. In an exemplary embodiment, the data part of Msg1 905 includes a UE identity, for purposes of contention resolution. For a connected UE 901 that uses a Cell Radio Network Temporary Identifier (C-RNTI), C-RNTI can be used as the UE identity. For an inactive UE 901 that may not have a C-RNTI, resume ID (and short MAC-I) can be used as the UE identity.

It should be appreciated that multiple UEs may select the same RA preamble and use the same UL resource for Msg1 transmission. Accordingly, NW 902 may transmit message 2 (Msg2) 906 for contention resolution. Msg2 906 should include or be addressed to the UE identity provided in Msg1 1005. The content of Msg2 906 may depend on the use case that triggers the 2-step RACH procedure. Msg2 906 may include contention resolution identity (e.g., UE identity in Msg1 905), a timing advance value (based on Msg1 transmission), a UL grant, or a C-RNTI assigned by NW 902.

For the purposes of this disclosure, the following terms may be used, and exemplary and non-limiting descriptions are provided. The term "base station" (BS), as used in the subject disclosure, refers to a network control unit or a network node in the NR that could be used to control one or multiple TRPs associated with one or multiple cells. Communication between BS and TRP(s0 can occur via a fronthaul connection. A BS could be referred to as a central unit (CU), eNB, gNB, or NodeB. A "TRP", as used herein, is a transmission and reception point that provides network coverage and directly communicates with UEs. A TRP could be referred to as a distributed unit (DU) or network node. A "cell", as used herein, could be composed of one or more multiple associated TRPs, i.e., the coverage of the cell is a superset of the coverage of all the individual TRP(s) associated with the cell. One cell could be controlled by one BS. A cell can be referred to as a TRP group (TRPG). A "numerology" corresponds to one subcarrier spacing in the frequency domain. By scaling a basic subcarrier spacing by an integer N, different numerologies can be defined consistent with 3GPP TR 38.802 V1.2.0. A "TTI duration" corresponds to a number of consecutive symbols in the time domain in one transmission direction. Different TTI durations can be defined when using different symbols (e.g., corresponding to a mini-slot, one slot, or several slots in one transmission direction) as described in 3GPP TR 38.802 V1.2.0.

In the RACH procedure for LTE, there are several circumstances in which the user equipment (UE) may need to perform a backoff mechanism to delay transmission of the random access procedure by a backoff time. For example, the UE may be unable to receive any Random Access Response (RAR) within a RAR window. In addition, the UE may receive an RAR, but the Random Access Preamble ID (RAPID) in the RAR does not match the preamble ID transmitted by the UE, i.e., RAR reception is not successful. Moreover, if contention resolution is not successful, the UE may delay the subsequent random access transmission by the backoff time. There may be multiple UEs that may have transmitted the same preamble resource and have received the same RAR due to having the same Radio Access Radio Network Temporary Identifier (RA-RNTI) and RAPID, resulting in those UEs receiving the same backoff indicator (BI) in the MAC subheader. The UEs may thus select a random backoff time according to a uniform distribution between 0 and the backoff value to delay. However, this procedure may result in unacceptable delays for delay-critical services, e.g., URLLC.

It is appreciated that in view of the different services to be accommodated and other factors, a need exists for a flexible procedure to satisfy the needs of different UEs and to enhance the resolution of congestion in RA procedures. In order to increase the flexibility to satisfy the requirement of any kind of UE and to enhance the efficiency for solving the congestion of RA procedure, different backoff time for different types of UEs which choose the same preamble resource may be required.

Several factors may be considered in adjusting the backoff time. First, the type of service (e.g., URLLC, eMBB, mMTC) may be considered, with a shorter backoff time, or no backoff time for delay sensitive services. Different services have different levels of delay tolerance. For example, URLLC is delay sensitive, requiring a shorter backoff time (or no backoff time at all). However, eMBB is delay tolerant, allowing transmission to be delayed for a period. Similarly, backoff time may be extended for mMTC due to latency requirement or power consumption issues.

Second, the numerology and TTI duration (or TTI length) can be considered. In LTE, one TTI is one millisecond. But in NR, one TTI may not always be one millisecond, i.e., different TTI durations can be applied. In another aspect, the unit of backoff parameter value is one millisecond in LTE. If the mechanism of backoff is inherited from LTE, no matter the TTI durations of UEs are the same or not, theses UEs should delay based on the same time unit. However, the main purpose of shorter TTI duration is used to satisfy the latency requirement. Hence, the unit of backoff parameter value could be associated with TTI duration. For example, consider two UEs with the same backoff parameter value, e.g., 30 delay units. The TTI duration used by the first UE (e.g., for URLLC service) is 0.5 ms and the TTI duration used by the second UE (e.g., for eMBB service) is 1 ms. The first UE could delay for 0-15 ms, and the second UE could delay for 0-30 ms. The same backoff parameter value may be indicated by the same or different random access responses.

The purpose of the random access may be considered as a factor. As set forth in section 10.1.5 of 3GPP 36.300 V14.1.0, purpose may include initial access from an RRC_IDLE state, RRC connection re-establishment, handover, DL data arrival during RRC_CONNECTED requiring random access procedure, when UL synchronisation status is "non-synchronised", UL data arrival during RRC_CONNECTED requiring random access procedure, and for positioning purpose during RRC_CONNECTED requiring random access procedure.

Another factor may be small data transmission. As disclosed in 3GPP TR 38.913 V14.1.0, the latency requirement for infrequent small packets is 10 seconds (compared user plane latency targets of 0.5 ms for URLLC and 4 ms for eMBB). If random access procedure is triggered by small data transmission, the backoff time may be longer than for normal data transmission.

Another factor is a request for Other SI. As disclosed in 3GPP TR 38.804 V0.4.0 (November 2016), "3rd Generation Partnership Project; Technical Specification Group Radio Access Network; Study on New Radio Access Technology; Radio Interface Protocol Aspects (Release 14)", which is incorporated by reference here in its entirety, Other SI is system information not broadcast in Minimum SI, which is basic information required for initial access to a cell and information needed for the UE to acquire Other SI. Special preamble resources may be reserved for an Other SI request, with more than one preamble resource reserved if there is more than one system information block (SIB) and each SIB can be requested separately. The response for Other SI in Msg2 can be signaled in a broadcast or multi-cast manner. Even if more than one UE requests the Other SI or the same SIB of Other SI simultaneously, a contention issue may not exist, as UEs can acquire the same Other SI in the subsequent response. Thus, backoff time may not be required for the RA of Other SI request.

Radio Resource Control (RRC) state may also be a factor. In addition to RRC_CONNECTED and RRC_IDLE, a new RRC state—RRC_INACTIVE—has been proposed. The UE may apply different backoff times in different RRC states. For example, the control plane latency requirement is more delay tolerant than in the user plane. Accordingly, a longer delay may be acceptable for a UE in the RRC_IDLE state than for a UE in RRC_CONNECTED. The RRC_INACTIVE state has a lower power consumption requirement, e.g., for mMTC devices, and may accept a longer backoff time.

Another factor is the duration of RA failure. For example, two UEs may be performing the RA procedure unsuccessfully, with the first UE performing the RA procedure for longer than the second UE. In such a case, it may be desirable for the first UE to be given a shorter backoff time than the second UE.

A similar factor is failure of Msg2 and message 4 (Msg4). In one RA procedure, Msg2 failure occurs earlier than Msg4 failure. Regardless of which failure occurs first, the UE follows the same backoff mechanism, with the UE delaying by the same backoff time and performing the RA procedure again. However, different backoff times for different failure cases may be desirable. For example, lower latency, and thus, a lower backoff time may be desirable in the event of Msg4 failure. As another example, Msg4 failures are more likely to be caused by contention, whereas Msg2 failure may be caused for insufficient power. In such a case, the backoff time for Msg4 failure may be set longer than for Msg2 failure.

As another factor, the difference between a 2-step RA procedure and a 4-step RA procedure may be accommodated. As the 2-step procedure is utilized to reduce latency of UL transfer, the backoff time could be dispensed with, or shortened, compared to the 4-step RA procedure.

Illustrated in FIG. 10 is an example, non-limiting methodology for adjusting a backoff time by an offset value. In flow diagram 1000, at Step 1002, a UE receives an RAR that includes a BI. At Step 1004, the UE determines which factors should be considered in determining the new backoff time. At Step 1006, the UE adds or subtracts an offset value to the original backoff value in the BI to determine a new backoff value. The offset value may be associated with a factor. For example, if a factor requires a shorter backoff time, e.g., URLLC, then the UE may subtract the original backoff value in the BI by the offset value, resulting in a shorter backoff time. Conversely, if the factor is delay tolerant, the UE may add the offset the original backoff value in the BI, resulting in a longer backoff time.

In one embodiment, when the UE receives the RAR with BI, the UE could plus or minus an offset on backoff time. The offset could be associated with the factor. For example, if the factor needs shorter backoff time, the UE could minus the backoff time with a positive offset (e.g. new backoff time=original backoff time−offset). On the contrary, if the factor is delay tolerant, the backoff time could be plus with a positive offset.

Figure 11:
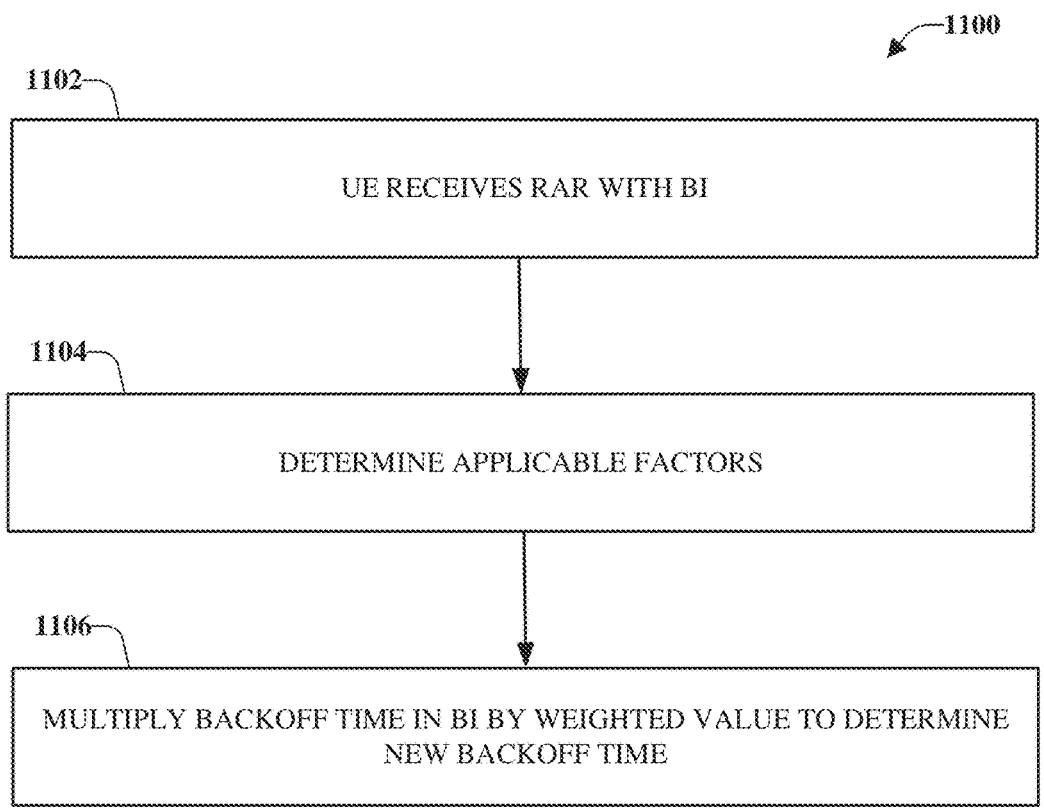
FIG. 11 illustrates an example, non-limiting methodology for adjusting a backoff time by a weighed value.

Illustrated in FIG. 11 is an example, non-limiting methodology for adjusting a backoff time by a weighed value. In flow diagram 1100, at Step 1102, the UE receives a RAR with a BI. At Step 1104, the UE determines which factors are applicable in determining a new backoff time from the original backoff time in the BI. At Step 1106, the UE multiplies the original backoff time by a weighted value to determine a new backoff time. The weighted value may be associated with a factor. For example, if the factor delay sensitive, a weighted value X may be applied, and if the factor is delay tolerant, a weighted value Y may be applied, such that Y is greater than X. A weighted value of zero (0) may be applied. The weighted value may also be related to numerology and/or TTI duration (or length). Backoff time adjustment, whether by an offset value or a weighted value, may be configured by the network, or may be specified in the specification for the UE. In addition, whether to adjust the backoff time may be controlled by the network, or determined by the UE.

In one embodiment, when the UE receives the RAR with BI, it could multiply the backoff time by X. The number X could be associated with the factors listed above. For example, if the factor needs shorter backoff time, the UE could multiply the backoff time by X (e.g., new backoff time=original backoff time*X). If the factor is delay tolerant, the backoff time could be multiplied by Y, where the value of Y is higher than X. As another example, if the backoff time should not be applied due to the specific factor, the number X and/or Y could be 0. For another example, the number X and/or Y could be related to numerology and/or TTI duration (or length).

In LTE, only one BI is included in the MAC subheader. Regardless of the type of UE (i.e., the UE applying the types of factors described above that receives the RAR, the UE can only apply backoff based on one backoff parameter value. However, in NR, multiple backoff parameter values may be desirable.

Figure 12:
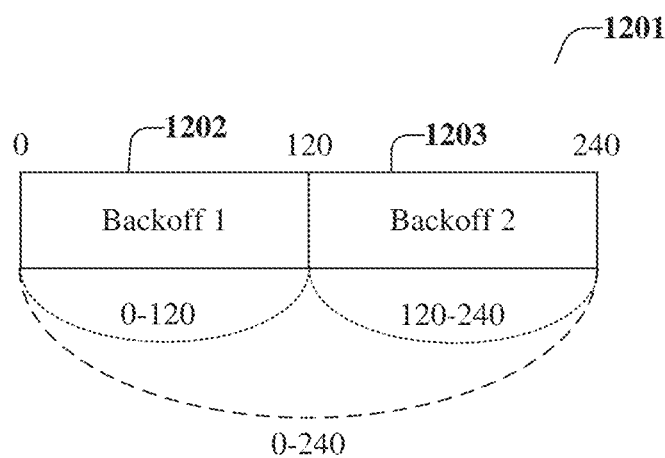
FIG. 12 illustrates an example, non-limiting illustration of two backoff parameter values that may be transmitted via a MAC PDU.

FIG. 12 is an example, non-limiting illustration of two backoff parameter values that may be transmitted via a MAC PDU. BI 1201 includes backoff parameter value 1 1202 and backoff parameter value 2 1203. BI 1201 defines a total interval of 240 ms. Backoff parameter value 1 1202 is set at 120 ms, encompassing an interval between 0 and 120 ms. Backoff parameter value 2 1203 is set at 240 ms, encompassing an interval between 120 ms and 240 ms. Based on backoff parameter value 1 1202 and backoff parameter 1203, a UE may select a backoff time in several ways. First, the UE may select a random backoff time according to a uniform distribution between 0 and backoff parameter value 1 1202, e.g., 0-120 ms. Second, the UE may select a random backoff time according to a uniform distribution between 0 and backoff parameter value 2 1203, e.g., 0-240 ms. Third, the UE may select a random backoff time according to a uniform distribution between backoff parameter value 1 1202 and backoff parameter value 2 1203, e.g., 120-240 ms. It will be appreciated that, if more than two backoff parameter values are used, more permutations with respect to the backoff time are possible. The multiple backoff parameter values may be included in the MAC subheader, or may be included in the payload of the RAR. The number of backoff parameter values that are transmitted may be fixed or configured by the network.

In one embodiment, the offset and/or weighted value could be configured by network or be specified in specification for UE. In another embodiment, whether to adjust backoff time could be controlled by network or determined by UE itself. In a further embodiment, multiple backoff parameter values could be included in the MAC subheader of RAR, or in the payload of RAR. In another embodiment, the number of backoff parameter values are transmitted could be fixed or configured by network node.

Figure 16:
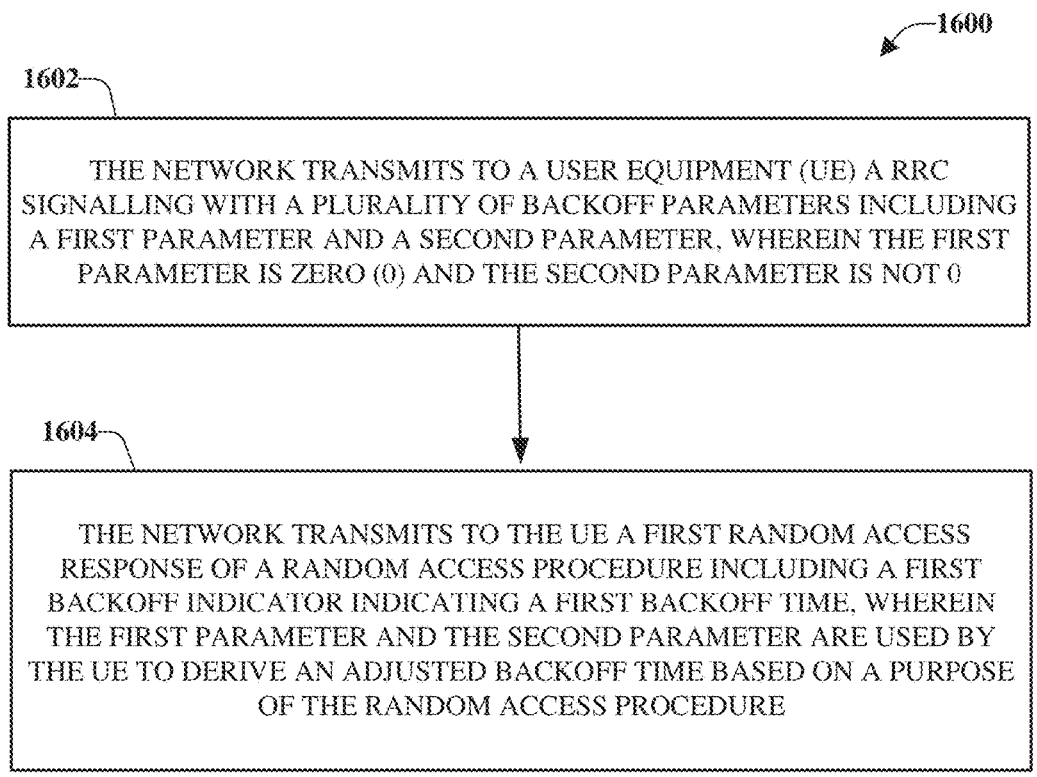
FIG. 16 illustrates an example, non-limiting methodology for transmitting a first parameter and a second parameter from which an adjusted backoff time may be derived.

Illustrated in FIG. 16 is an example, non-limiting methodology for transmitting a first parameter and a second parameter from which an adjusted backoff time may be derived. In flow diagram 1600, at Step 1602, the network node transmits to a user equipment (UE) a RRC signalling with a plurality of backoff parameters including a first parameter and a second parameter, wherein the first parameter is zero (0) and the second parameter is not 0; at Step 1604, the network node transmits to the UE a first random access response of a random access procedure including a first backoff indicator indicating a first backoff time, wherein the first parameter and the second parameter are used by the UE to derive an adjusted backoff time based on a purpose of the random access procedure.

In one embodiment, the plurality of backoff parameters is configured by the network node. In another embodiment, the purpose of the random access procedure is one of initial access from an RRC_IDLE state, RRC connection establishment, handover, download data arrival in a RRC_CONNECTED state, upload data arrival in an RRC_CONNECTED state, and a positioning purpose in an RRC_CONNECTED state. In a further embodiment, the first/second parameter is a weighted value, wherein the weighted value is configured by the network node. In another embodiment, the adjusted backoff time is derived from multiplying a backoff time by a weighted value.

In one embodiment, the value of the second parameter is higher than the value of the first parameter. In another embodiment, the first backoff indicator is included in a MAC header of the random access response. In a further embodiment, the network node controls whether the UE adjusts the backoff time. In one embodiment, whether to adjust the backoff time is controlled by the network node. In another embodiment, the second parameter is associated with a factor.

Figure 17:
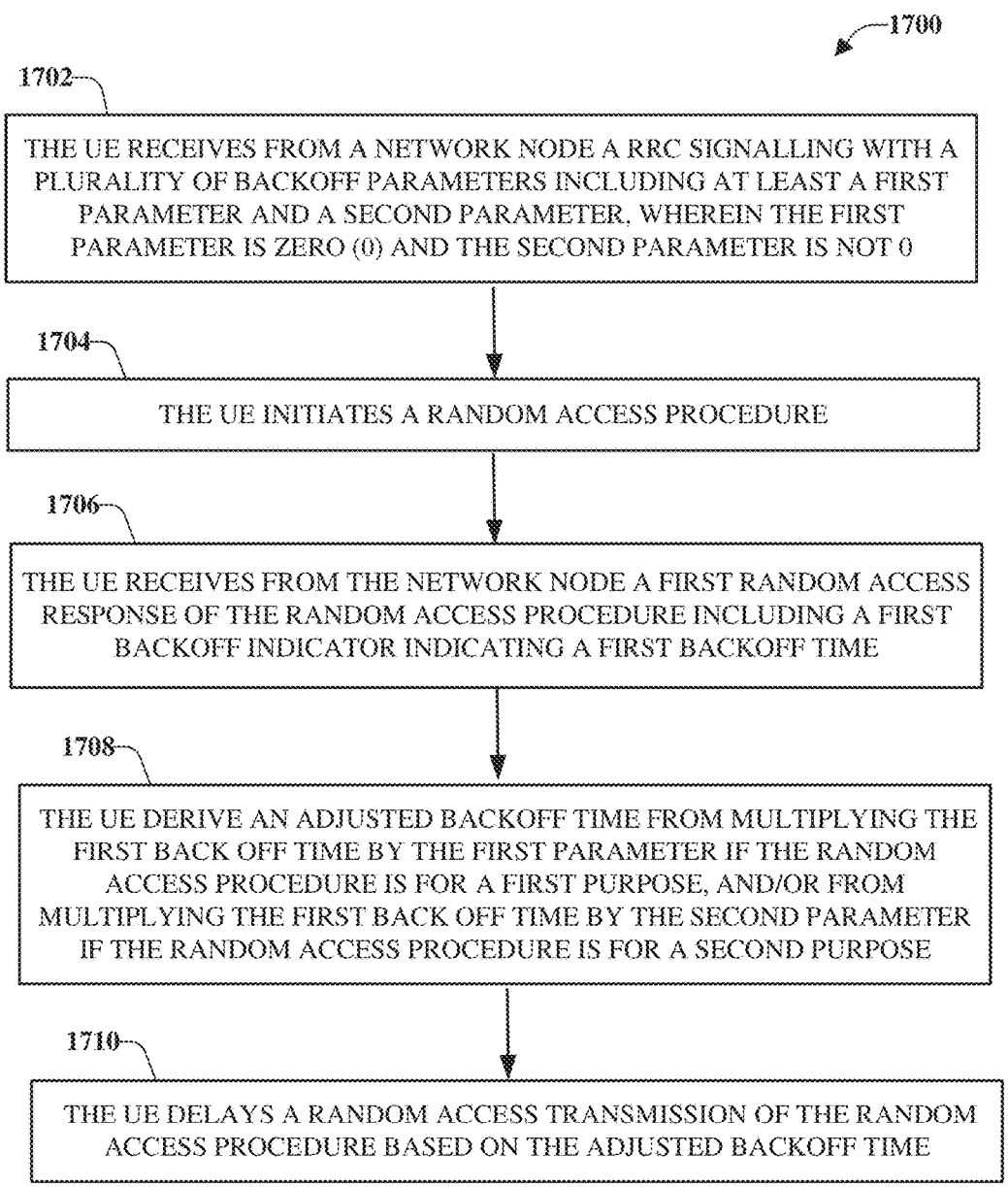
FIG. 17 illustrates an example, non-limiting methodology for a UE to derive an adjusted backoff time depending on a purpose of a random access procedure.

Illustrated in FIG. 17 is an example, non-limiting methodology for a UE to derive an adjusted backoff time depending on a purpose of a random access procedure. In flow diagram 1700, at Step 1702, the UE receives from a network node a RRC signaling with a plurality of backoff parameters including at least a first parameter and a second parameter, wherein the first parameter is zero (0) and the second parameter is not 0. At Step 1704, the UE initiates a random access procedure, and at Step 1706, the UE receives from the network node a first random access response of the random access procedure including a first backoff indicator indicating a first backoff time. At Step 1708, the UE derives an adjusted backoff time from multiplying the first backoff time by the first parameter if the random access procedure is for a first purpose, and/or from multiplying the first backoff time by the second parameter if the random access procedure is for a second purpose. At Step 1710, the UE delays a random access transmission of the random access procedure based on the adjusted backoff time.

In one embodiment, the plurality of backoff parameters is configured by the network node. In another embodiment, the first purpose comprises one of initial access from an RRC_IDLE state, RRC connection establishment, handover, download data arrival in a RRC_CONNECTED state, upload data arrival in an RRC_CONNECTED state, and a positioning purpose in an RRC_CONNECTED state. In a further embodiment, the second purpose comprises one of initial access from an RRC_IDLE state, RRC connection establishment, handover, download data arrival in a RRC_CONNECTED state, upload data arrival in an RRC_CONNECTED state, and a positioning purpose in an RRC_CONNECTED state. In one embodiment, the first/second parameter is a weighted value, wherein the weighted value is configured by the network node. In another embodiment, the adjusted backoff time is derived from multiplying a backoff time by a weighted value.

In one embodiment, the value of the second parameter is higher than the value of the first parameter. In another embodiment, the first backoff indicator is included in a MAC header of the random access response. In a further embodiment, the network node controls whether the UE adjusts the backoff time.

One aspect of this disclosure is a method for a network node, comprising transmitting a signal with a parameter to a UE, wherein the parameters is for the UE to adjust an original backoff time to a new backoff time based on at least a factor. In one embodiment, the original backoff time is a backoff time included in a random access response. As a further embodiment, the new backoff time can be derived from the original backoff time and the parameter.

Another aspect of this disclosure is a method for a UE, comprising receiving a signal with a parameter from a network node, and adjusting an original backoff time to a new backoff time by the parameter, wherein the parameter is associated with at least a factor. In one embodiment, the parameter could be dynamically/semi-statically transmitted or configured by the network node.

A further aspect of this disclosure is a method for a UE, comprising adjusting an original backoff time to a new backoff time by a parameter, wherein the parameter is associated with at least a factor. In other embodiments, the parameter is a fixed value, is configured by the network node, is determined by the UE based on the factor, and/or specified in a specification, wherein the specification is a 3GPP specification. In further embodiments, that the parameter is associated with at least a factor may mean that the value of the parameter is according to the factor, that the UE determines whether to utilize the parameter is according to the factor, that determination for the parameter is related to the factor, and/or that different factors would cause the UE to use a different parameter.

In other embodiments, the signal is a RRC signalling, a PHY signalling, or a MAC signalling (e.g., MAC PDU or MAC CE). In a further embodiment, the original backoff time is obtained from a random access response. In another embodiment, the new backoff time can be derived from the original backoff time and the parameter. In a further embodiment, the original backoff time is an integer. In another embodiment, the new backoff time is an integer.

In one embodiment, adjusting the original backoff time to the new backoff time by the parameter includes the UE adding (e.g., plus) or subtracting (e.g., minus) the original backoff time by the parameter to derive the new backoff time, wherein the parameter is an offset value (e.g., a number n). In a further embodiment, the number n is a positive or a negative value. In another embodiment, adjusting the original backoff time to the new backoff time by the parameter includes the UE multiplying the original backoff time by the parameter to derive the new backoff time, wherein the parameter is a weighted value. In a further embodiment, the weighted value is an integer. In a further embodiment, the weighted value is zero (0). In a further embodiment, the weighted value is a ratio n %, wherein the ration n % is between 0% and 100%. In another embodiment, whether the UE needs to adjust the original backoff time is controlled by the network node. In a further embodiment, whether the UE needs to adjust the original backoff time could be determined by the UE itself based on a corresponding configuration.

One aspect of this disclosure is a method for a network node, comprising transmitting multiple backoff indicators (e.g., a first backoff indicator and a second backoff indicator) via a random access response, wherein the number of the backoff indicators and the value of the backoff indicators are determined based on at least a factor. Another aspect of this disclosure is a method for a UE, comprising receiving a random access response including multiple backoff indicators (e.g., a first backoff indicator and a second backoff indicator), wherein the backoff indicators are for the UE do delay a random access procedure, selecting a backoff time by the backoff indicators based on at least a factor, and delaying the random access procedure based on the backoff time.

In one embodiment, the number of the backoff indicators and the value of the backoff indicators based on at least a factor includes determination of the number and the value for the backoff indicators that is related to the factor. In another embodiment, the backoff indicator indicates a parameter for the UE to perform backoff. In a further embodiment, selecting the backoff time by the backoff indicators includes selecting a random backoff time according to a uniform distribution based on multiple backoff indicators (e.g., the first backoff indicator and the second backoff indicator). In another embodiment, selecting the backoff time by the backoff indicators includes selecting a random backoff time according to a uniform distribution between zero (0) and the second backoff indicator. In a further embodiment, selecting the backoff time by the backoff indicators includes selecting a random backoff time according to a uniform distribution between the first backoff indicator and the second backoff indicator. In another embodiment, selecting the backoff time by the backoff indicators includes selecting a random backoff time according to a uniform distribution between zero (0) and the first backoff indicator.

In other embodiments, the number of multiple backoff indicators is related to the factor, is fixed, is dynamically indicatorid, or is configured by the network node. In further embodiments, delaying the random access procedure based on the backoff time includes delaying the subsequent random access transmission by the backoff time, stopping the ongoing random access transmission for the backoff time and then restarting the random access transmission, or waiting for the backoff time and retransmitting the preamble again to retry the random access procedure. In other embodiments, the random access response is Msg2 of a random access procedure, a MAC PDU. In other embodiments, the random access response comprises a MAC header and MAC RARs, wherein the MAC header comprises at least a MAC subheader. In further embodiments, the backoff indicator is included in a MAC header of a random access response, is included in a MAC RAR of a random access response, and/or indicates the backoff time.

In one embodiment, the factor is related to a service (e.g., URLLC/eMBB/mMTC). In another embodiment, each service has a different requirement (e.g., for latency or reliability). In a further embodiment, each service is associated with a different numerology and/or TTI length. In another embodiment, the factor is related to numerology and/or TTI duration (or TTI length). In a further embodiment, the factor is related to a purpose of the random access procedure (e.g., small data transmission, Other SI request). In another embodiment, the purpose of the random access procedure includes a purpose for which the random access procedure is triggered. In a further embodiment, the factor is RRC state (e.g., RRC_IDLE, RRC_INACTIVE, RRC_CONNECTED).

In one embodiment, the factor is the duration of random access failure. In another embodiment, the duration of random access failure is measured from the time the random access failure occurred. In another embodiment, the factor is the random access failure includes Msg2 failure and/or Msg4 failure. In a further embodiment, the factor is Msg2 failure and/or Msg4 failure. In another embodiment, the Msg2 failure is caused by unsuccessful random access response reception. In further embodiments, the Msg2 failure comprises the UE being unable to receive any random access response during a RAR window, or comprises the UE receiving a random access response by RAPID in the random access response does not match a preamble ID transmitted by the UE. In another embodiment, the Msg4 failure comprises unsuccessful contention resolution of the random access procedure. In a further embodiment, the factor is comprises a 2-step RA and/or 4-step RA. In another embodiment the factor influences the network node to configure different backoff times for the UE.

In one embodiment, the UE determines and/or selects the backoff time based on the factor. In another embodiment, parameters of multiple backoff time are related to the factors. In a further embodiment, the network node comprises a gNB, a TRP, or a cell.

Figure 18:
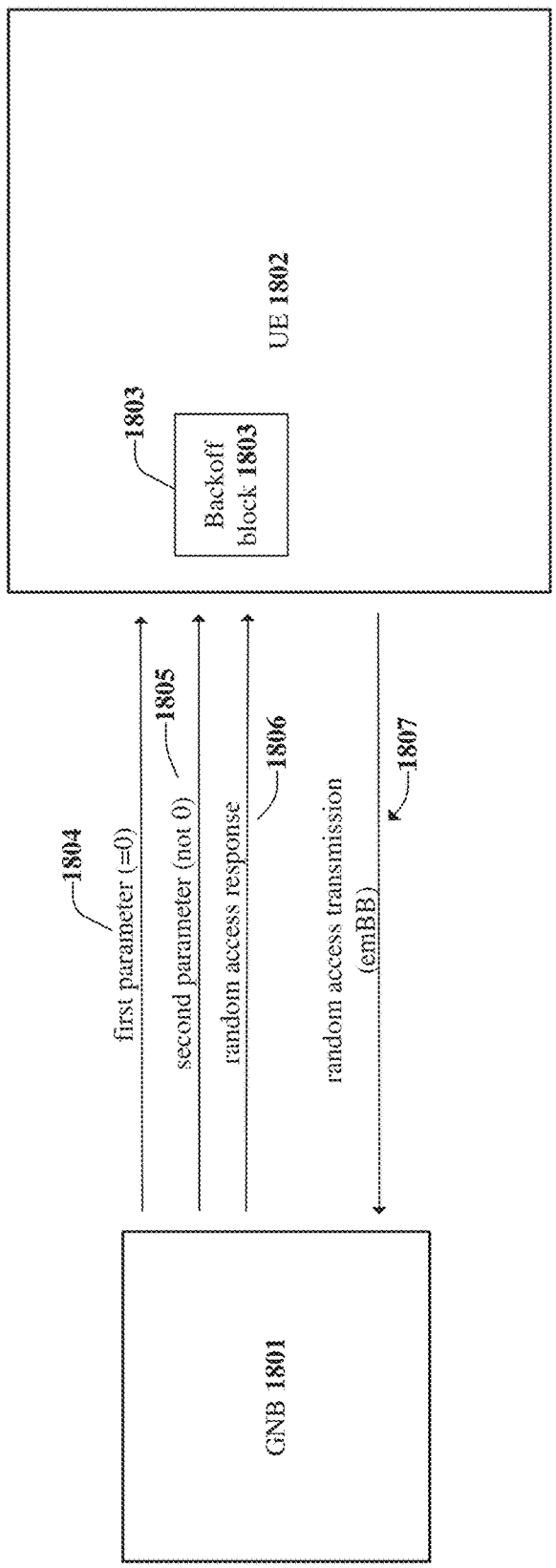
FIG. 18 illustrates an example, non-limiting wireless communication system in accordance with one or more embodiments herein.

FIG. 18 illustrates an example, non-limiting wireless communication system in accordance with one or more embodiments herein. UE 1802 communicates with gNB 1801, and includes a backoff block 1803. As illustrated, gNB 1801 transmits to UE 1802 a first parameter 1804, with a value of zero (0), and a second parameter 1805 that is not 0. gNB 1801 subsequently transmits a random access response 1806 in response to a random access procedure (not shown) initiated by UE 1802. In this example, the random access procedure is initiated for eMBB transmission, which is delay tolerant. The random access response 1806 includes a backoff indicator with a backoff time. Upon receipt of the random access response 1806 by UE 1802, backoff block 1803 determines that backoff time should be adjusted by the second parameter 1805, and multiplies the backoff time by the second parameter 1805 to derive an adjusted backoff time, e.g., 4 ms. After delaying by the 4 ms adjusted backoff time, UE 1802 proceeds with random access transmission 1807 to gNB 1801.

Figure 13:
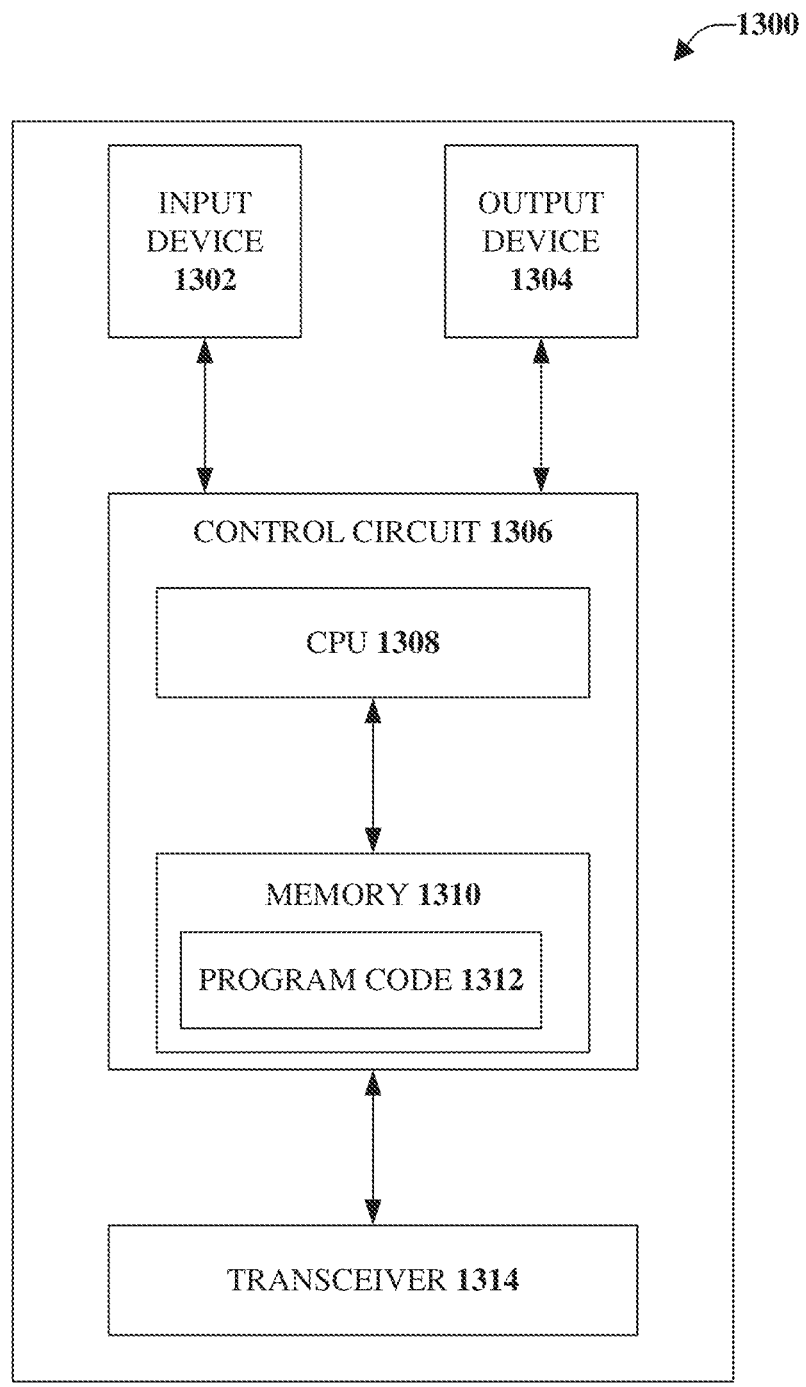
FIG. 13 illustrates an alternative simplified block diagram of a communication device, in accordance with one or more embodiments described herein.

Turning to FIG. 13, illustrated is an alternative simplified functional block diagram of a communication device 1300 in accordance with one or more embodiments described herein. As illustrated in FIG. 13, the communication device 1300 in a wireless communication system can be utilized for realizing the mobile devices (or UEs) 114 and 120 in FIG. 1, and the wireless communications system can be a 5G system. The communication device 1300 can include an input device 1302, an output device 1304, a control circuit 1306, a central processing unit (CPU) 1308, a memory 1310, a program code 1312, and a transceiver 1314. The control circuit 1306 executes the program code 1312 in the memory 1310 through the CPU 1308, thereby controlling an operation of the communication device 1300. The program code 1312 can be executed to perform the techniques illustrated in FIGS. 2-12. The communications device 1300 can receive signals input by a user through the input device 1302, such as a keyboard or keypad, and can output images and sounds through the output device 1304, such as a monitor or speakers. The transceiver 1314 is used to receive and transmit wireless signals, delivering received signals to the control circuit 1306, and outputting signals generated by the control circuit 1306 wirelessly. A device similar to the communication device 1300 in a wireless communication system can also be utilized for realizing the network node 100 in FIG. 1.

Figure 14:
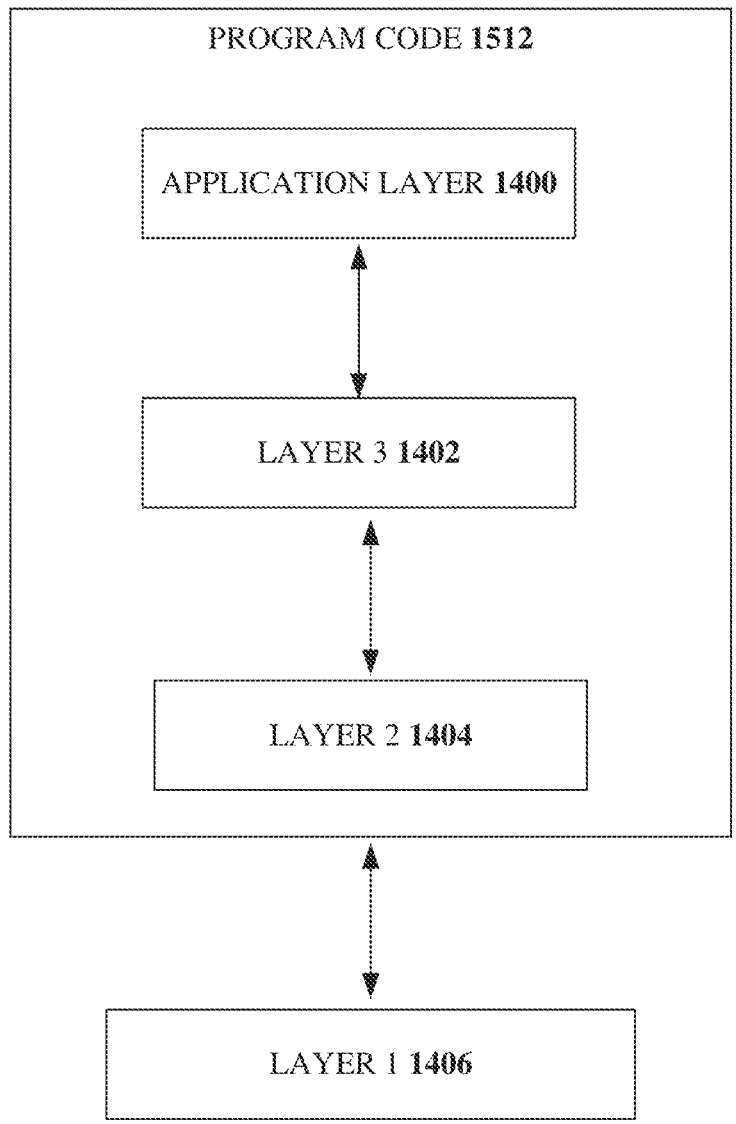
FIG. 14 illustrates a simplified block diagram of the program code shown in FIG. 13, in accordance with one or more embodiments described herein.

FIG. 14 is a simplified block diagram of the program code 1312 shown in FIG. 13, in accordance with one or more embodiments described herein, including but not limited to executing the methodologies illustrated in FIGS. 10-11. In this embodiment, the program code 1312 includes an application layer 1400, a Layer 3 portion 1402, and a Layer 2 portion 1404, and is coupled to a Layer 1 portion 1406. The Layer 3 portion 1402 generally performs radio resource control. The Layer 2 portion 1404 generally performs link control. The Layer 1 portion 1406 generally performs physical connections. For a 5G system, the Layer 2 portion 1404 may include a Radio Link Control (RLC) layer and a Medium Access Control (MAC) layer. The Layer 3 portion 1402 may include a Radio Resource Control (RRC) layer.

Figure 15:
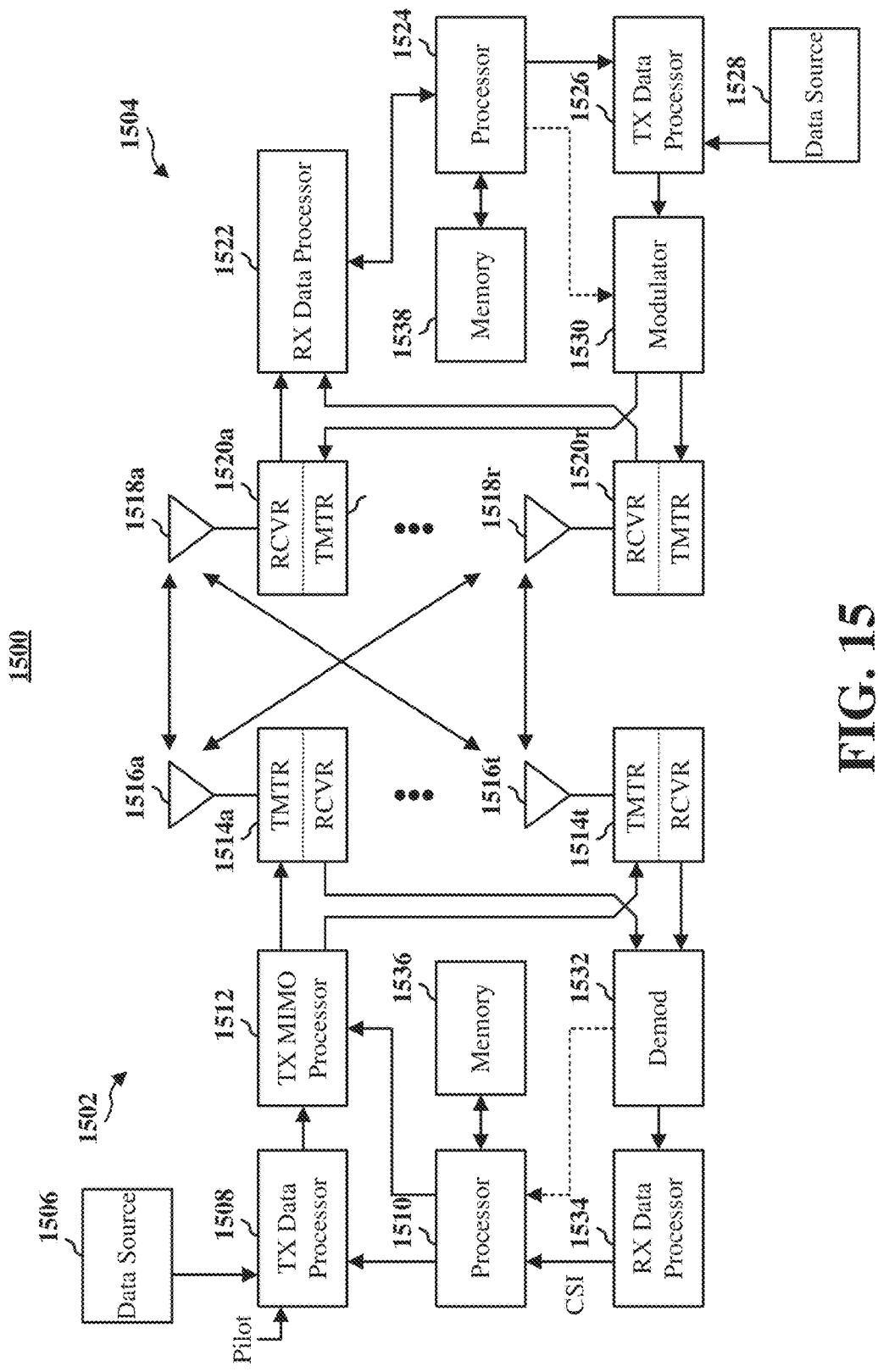
FIG. 15 illustrates a simplified block diagram of an embodiment of a wireless communications system that includes a transmitter system and a receiver system, in accordance with one or more embodiments described herein.

FIG. 15 illustrates a simplified block diagram of an embodiment a MIMO system 1500 that includes of a transmitter system 1502 (also known as the access network) and a receiver 1504 (also known as user equipment (UE)) in accordance with one or more embodiments described herein. At the transmitter system 1502, traffic data for a number of data streams is provided from a data source 1506 to a transmit (TX) data processor 1508.

In one embodiment, each data stream is transmitted over a respective transmit antenna. TX data processor 1508 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 1510.

The modulation symbols for all data streams are then provided to a TX MIMO processor 1512, which may further process the modulation symbols (e.g., for OFDM). TX MIMO processor 1512 then provides $N_T$ modulation symbol streams to $N_T$ transmitters (TMTR) 1514a through 1514t. In certain embodiments, TX MIMO processor 1512 applies beamforming weights to the symbols of the data streams and to the antenna from which the symbol is being transmitted.

Each transmitter 1514 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 1514a through 1514t are then transmitted from $N_T$ antennas 1516a through 1516t, respectively. At receiver system 1504, the transmitted modulated signals are received by $N_R$ antennas 1518a through 1518r and the received signal from each antenna 1518 is provided to a respective receiver (RCVR) 1520a through 1520r. Each receiver 1520 conditions (e.g., filters, amplifies, and down converts) a respective received signal, digitizes the conditioned signal to provide samples, and further processes the samples to provide a corresponding "received" symbol stream.

An RX data processor 1522 then receives and processes the $N_R$ received symbol streams from $N_R$ receivers 1520 based on a particular receiver processing technique to provide $N_T$ "detected" symbol streams. The RX data processor 1522 then demodulates, deinterleaves, and decodes each detected symbol stream to recover the traffic data for the data stream. The processing by RX data processor 1522 is complementary to that performed by TX MIMO processor 1512 and TX data processor 1508 at transmitter system 1502. A processor 1524 periodically determines which pre-coding matrix to use. Processor 1524 formulates a reverse link message comprising a matrix index portion and a rank value portion.

The reverse link message may comprise various types of information regarding the communication link and/or the received data stream. The reverse link message is then processed by a TX data processor 1526, which also receives traffic data for a number of data streams from a data source 1528, modulated by a modulator 1530, conditioned by transmitters 1520a through 1520r, and transmitted back to transmitter system 1502.

At transmitter system 1502, the modulated signals from receiver 1504 are received by antennas 1516, conditioned by receivers 1514, demodulated by a demodulator 1532, and processed by a RX data processor 1534 to extract the reserve link message transmitted by the receiver system 1504. Processor 1510 then determines which pre-coding matrix to use for determining the beamforming weights then processes the extracted message. Memory 1536 can be used to temporarily store some buffered/computational data from 1532 or 1534 through processor 1510, store some buffered data from 1506, or store some specific program codes. Further, memory 1538 may be used to temporarily store some buffered/computational data from 1522 through processor 1524, store some buffered data from 1528, or store some specific program codes.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/ processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects, a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signalling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signalling-stream from one or more subscriber stations. Data and signalling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In summary, in exemplary embodiments, the present invention relates to a method and apparatus for a backoff mechanism applied for a random access procedure for a user equipment (UE) (e.g. mobile phone) in a wireless communication system. Preferably, the UE applies different backoff times for random access procedures based on different factors applicable to the UE. The UE may adjust the backoff time by an offset or a weighted value, and may determine a backoff time based on multiple backoff parameter values.

What is claimed is:

1. A method for a network node, comprising:
    transmitting, from the network node to a user equipment (UE), a radio resource control (RRC) signalling with a plurality of backoff parameters including a first parameter and a second parameter, wherein the first parameter is zero (0) and the second parameter is not 0; and
    transmitting, from the network node to the UE after transmitting the RRC signalling, a first random access response of a random access procedure including a first backoff indicator indicating a first backoff time, wherein whether to use the first parameter or the second parameter by the UE to adjust the backoff time is based on a purpose of the random access procedure.

2. The method of claim 1, wherein the plurality of backoff parameters is configured by the network node.

3. The method of claim 1, wherein a purpose of the random access procedure is one of initial access from an RRC_IDLE state, RRC connection establishment, handover, downlink data arrival in a RRC_CONNECTED state, uplink data arrival in an RRC_CONNECTED state, and a positioning purpose in an RRC_CONNECTED state.

4. The method of claim 1, wherein at least one of the first parameter or the second parameter is a weighted value which is configured by the network node.

5. The method of claim 1, wherein the adjusted backoff time is derived from the first backoff time and a weighted value.

6. The method of claim 1, wherein the value of the second parameter is higher than the value of the first parameter.

7. The method of claim 1, wherein the first backoff indicator is included in a MAC header of the random access response.

8. The method of claim 1, wherein the network node controls whether the UE adjusts the backoff time.

9. The method of claim 1, wherein, wherein the UE determines to use at least one of the first parameter or the second parameter based on a factor.

10. A method for a user equipment (UE), comprising:
receiving, by the UE from a network node, a radio resource control (RRC) signalling with a plurality of backoff parameters including a first parameter and a second parameter, wherein the first parameter is zero (0) and the second parameter is not 0;
initiating, by the UE, a random access procedure after receiving the RRC signalling;
receiving, by the UE from the network node a first random access response of the random access procedure including a first backoff indicator indicating a first backoff time;
deriving, by the UE, an adjusted backoff time from multiplying the first backoff time by the first parameter if the random access procedure is for a first purpose, or from multiplying the first back off time by the second parameter if the random access procedure is for a second purpose; and
delaying, by the UE, a random access transmission of the random access procedure based on the adjusted backoff time.

11. The method of claim 10, wherein the plurality of backoff parameters is configured by the network node.

12. The method of claim 10, wherein the first purpose comprises one of initial access from an RRC_IDLE state, RRC connection establishment, handover, downlink data arrival in a RRC_CONNECTED state, uplink data arrival in an RRC_CONNECTED state, and a positioning purpose in an RRC_CONNECTED state.

13. The method of claim 10, wherein the second purpose comprises one of initial access from an RRC_IDLE state, RRC connection establishment, handover, downlink data arrival in a RRC_CONNECTED state, uplink data arrival in an RRC_CONNECTED state, and a positioning purpose in an RRC_CONNECTED state.

14. The method of claim 10, wherein at least one of the first parameter or the second parameter is a weighted value which is configured by the network node.

15. The method of claim 10, wherein the adjusted backoff time is derived from the first backoff time and a weighted value.

16. The method of claim 10, wherein the value of the second parameter is higher than the value of the first parameter.

17. The method of claim 10, wherein the first backoff indicator is included in a MAC header of the random access response.

18. The method of claim 10, wherein the network node controls whether the UE adjusts the backoff time.

19. The method of claim 10, wherein UE determines to use at least one of the first parameter or the second parameter based on a factor.

20. A communication device comprising:
a control circuit;
a processor installed in the control circuit; and
a memory installed in the control circuit and operatively coupled to the processor, wherein the processor is configured to execute a program code stored in the memory to perform steps comprising:
receiving from a network node a radio resource control (RRC) signalling with a number of backoff parameters including a first parameter and a second parameter, wherein the first parameter is zero (0) and the second parameter is not 0;
initiating a random access procedure;
receiving from the network node a first random access response of the random access procedure including a first backoff indicator indicating a first backoff time;
deriving an adjusted backoff time from the first parameter if the random access procedure is for a first purpose, and from the second parameter if the random access procedure is for a second purpose; and
delaying a random access transmission of the random access procedure based on the adjusted backoff time.

* * * * *